(12) United States Patent
Matsutani

(10) Patent No.: US 9,014,294 B2
(45) Date of Patent: Apr. 21, 2015

(54) COMMUNICATION SYSTEM, COMMUNICATION APPARATUS, AND COMMUNICATION INTEGRATED CIRCUIT

(75) Inventor: Takashi Matsutani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 351 days.

(21) Appl. No.: 13/520,742

(22) PCT Filed: Dec. 24, 2010

(86) PCT No.: PCT/JP2010/073333
§ 371 (c)(1),
(2), (4) Date: Jul. 5, 2012

(87) PCT Pub. No.: WO2011/086832
PCT Pub. Date: Jul. 21, 2011

(65) Prior Publication Data
US 2012/0281782 A1    Nov. 8, 2012

(30) Foreign Application Priority Data
Jan. 12, 2010    (JP) .................................. 2010-003969

(51) Int. Cl.
*H04L 27/00*    (2006.01)
*H04B 15/00*    (2006.01)
(Continued)

(52) U.S. Cl.
CPC ............ *H04B 15/005* (2013.01); *H04B 1/0475* (2013.01); *H04B 1/1607* (2013.01)

(58) Field of Classification Search
USPC .................................. 375/285, 346, 296, 259
See application file for complete search history.

(56) References Cited

U.S. PATENT DOCUMENTS

| 5,420,576 A | 5/1995 | Matai et al. |
| 7,782,190 B1 * | 8/2010 | Martin et al. ............ 340/539.12 |

(Continued)

FOREIGN PATENT DOCUMENTS

| CN | 1091874 A | 9/1994 |
| CN | 1706103 A | 12/2005 |

(Continued)

OTHER PUBLICATIONS

International Preliminary Report on Patentability and Written Opinion issued Aug. 7, 2012 in PCT/JP2010/073333 (with English translation).

(Continued)

*Primary Examiner* — Michael Neff
(74) *Attorney, Agent, or Firm* — Oblon, McClelland, Maier & Neustadt, L.L.P.

(57) ABSTRACT

A communication system includes a first communication apparatus and a second communication apparatus. The first communication apparatus generates and transmits communication data in accordance with a predetermined protocol. The second communication apparatus includes a power circuit section having a switching regulator, and is configured to receive the communication data transmitted from the first communication apparatus. The predetermined protocol includes a protocol defining that at least one portion of a bit sequence constituting the communication data should be associated with an operation of the switching regulator. The second communication apparatus causes the switching regulator to operate in a time period in which the at least one portion of the communication data is received, in a state where the communication data is received.

37 Claims, 19 Drawing Sheets

(51) Int. Cl.
*H04B 1/04* (2006.01)
*H04B 1/16* (2006.01)

(56) References Cited

U.S. PATENT DOCUMENTS

| | | |
|---|---|---|
| 2002/0028700 A1 | 3/2002 | Kato |
| 2004/0203544 A1 | 10/2004 | Levesque et al. |
| 2006/0128325 A1 | 6/2006 | Levesque et al. |
| 2008/0266110 A1* | 10/2008 | Hayford et al. ............ 340/572.8 |

FOREIGN PATENT DOCUMENTS

| | | |
|---|---|---|
| JP | 63 164533 | 7/1988 |
| JP | 4-366401 A | 12/1992 |
| JP | 6 53883 | 2/1994 |
| JP | 7-87678 | 3/1995 |
| JP | 11 103274 | 4/1999 |
| JP | 2000 22771 | 1/2000 |
| JP | 2002 141824 | 5/2002 |

OTHER PUBLICATIONS

Office Action issued on Feb. 18, 2014 in the corresponding Japanese Patent Application No. JP2011-549900 (with partial English translation).
International Search Report Issued Feb. 15, 2011 in PCT/JP10/73333 Filed Dec. 24, 2010.
Combined Chinese Office Action and Search Report issued Apr. 23, 2014 in Patent Application No. 201080061320.8 with partial English translation and Japanese translation.

* cited by examiner

F I G . 4
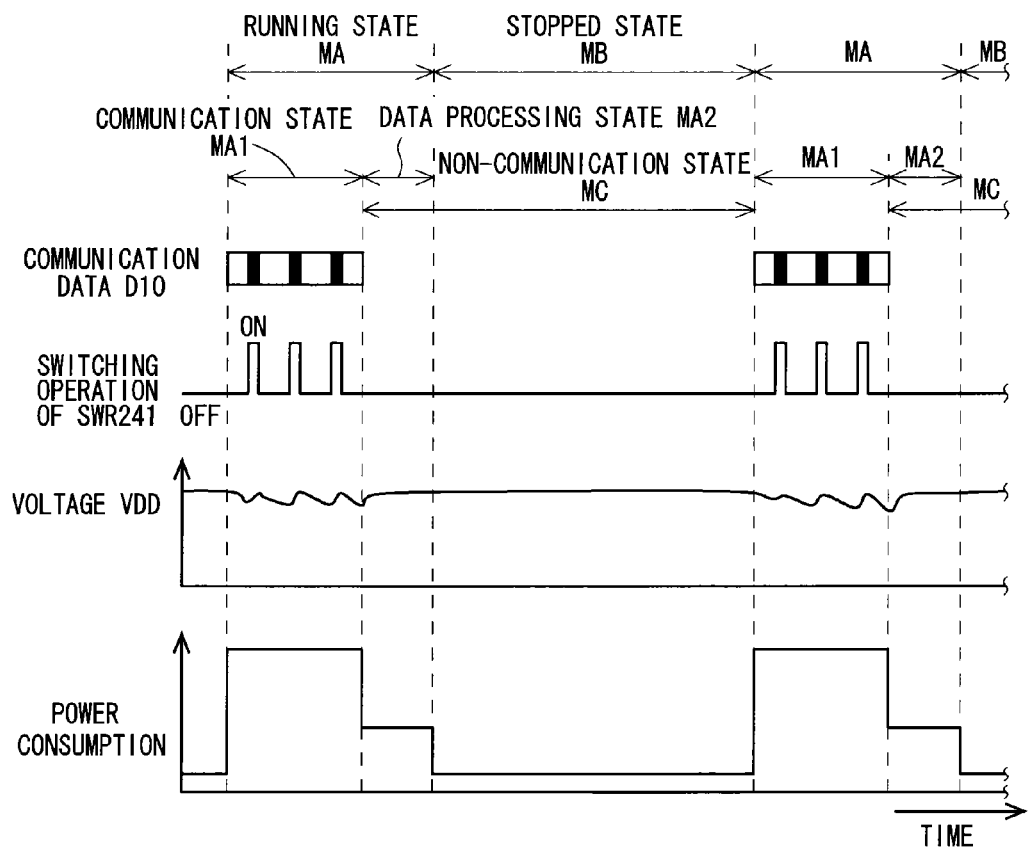

F I G. 5
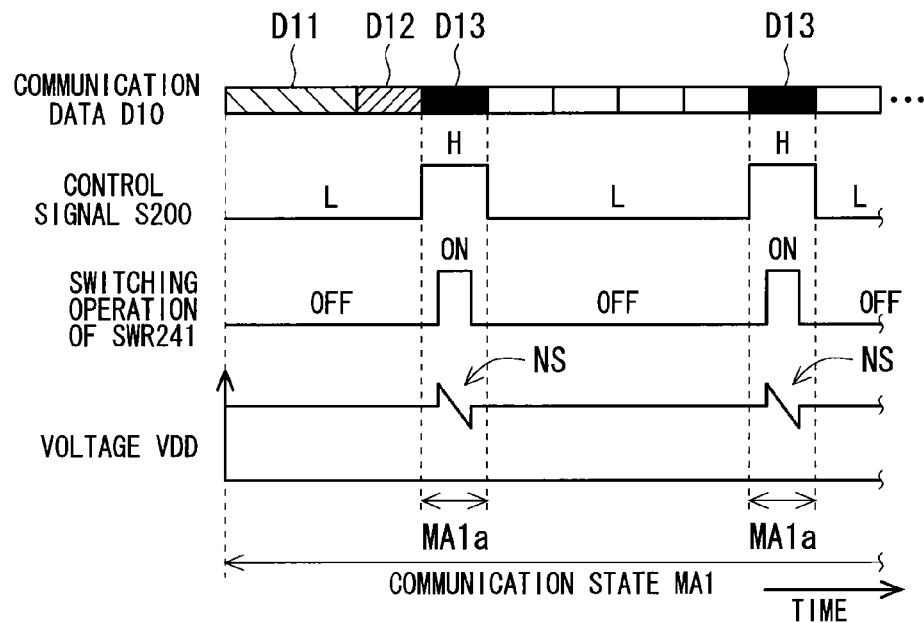
F I G. 6
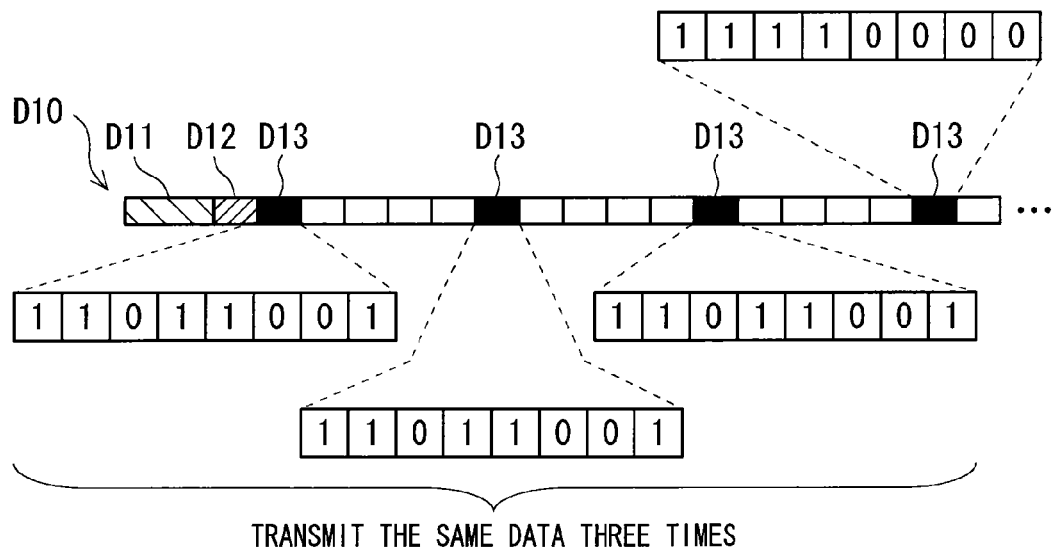

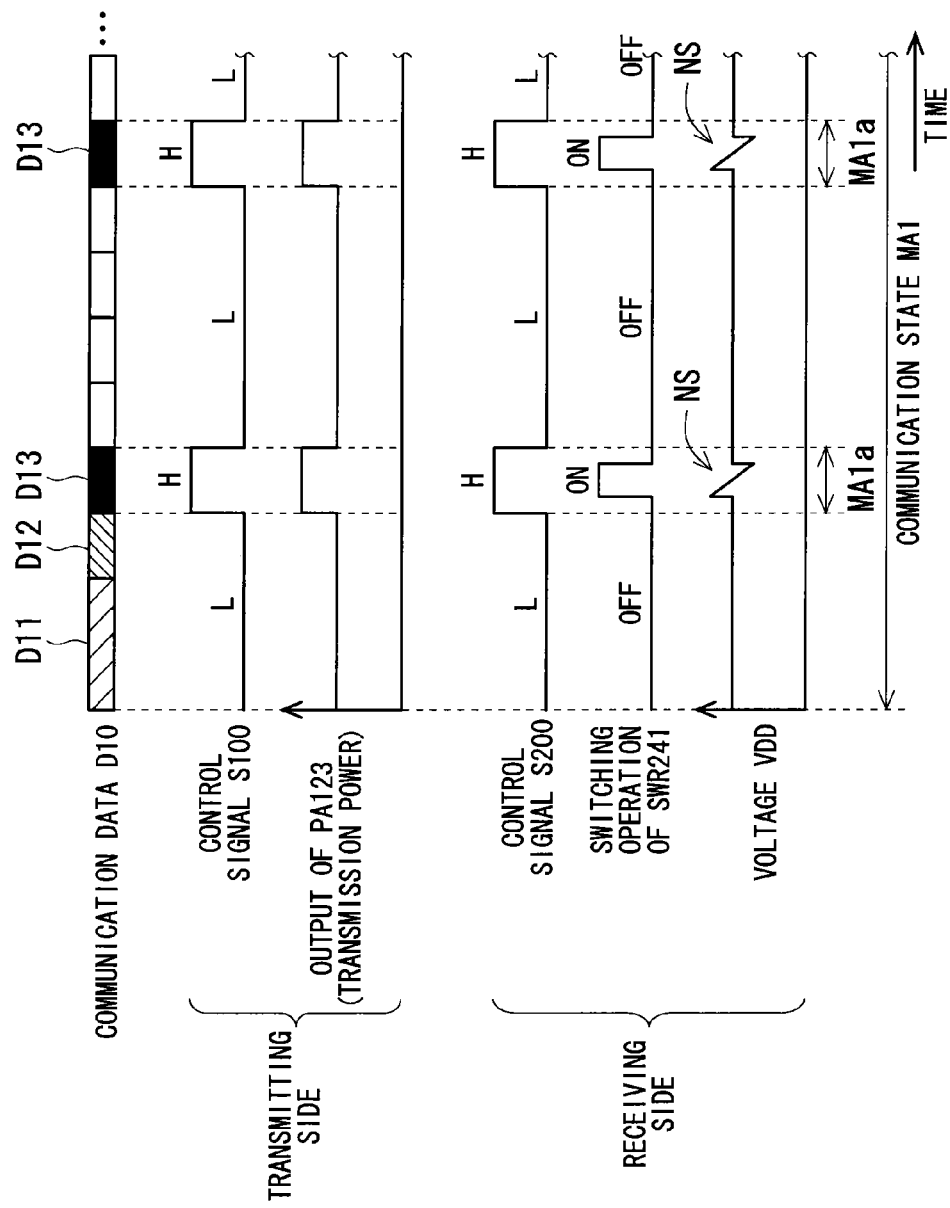

F I G . 1 3
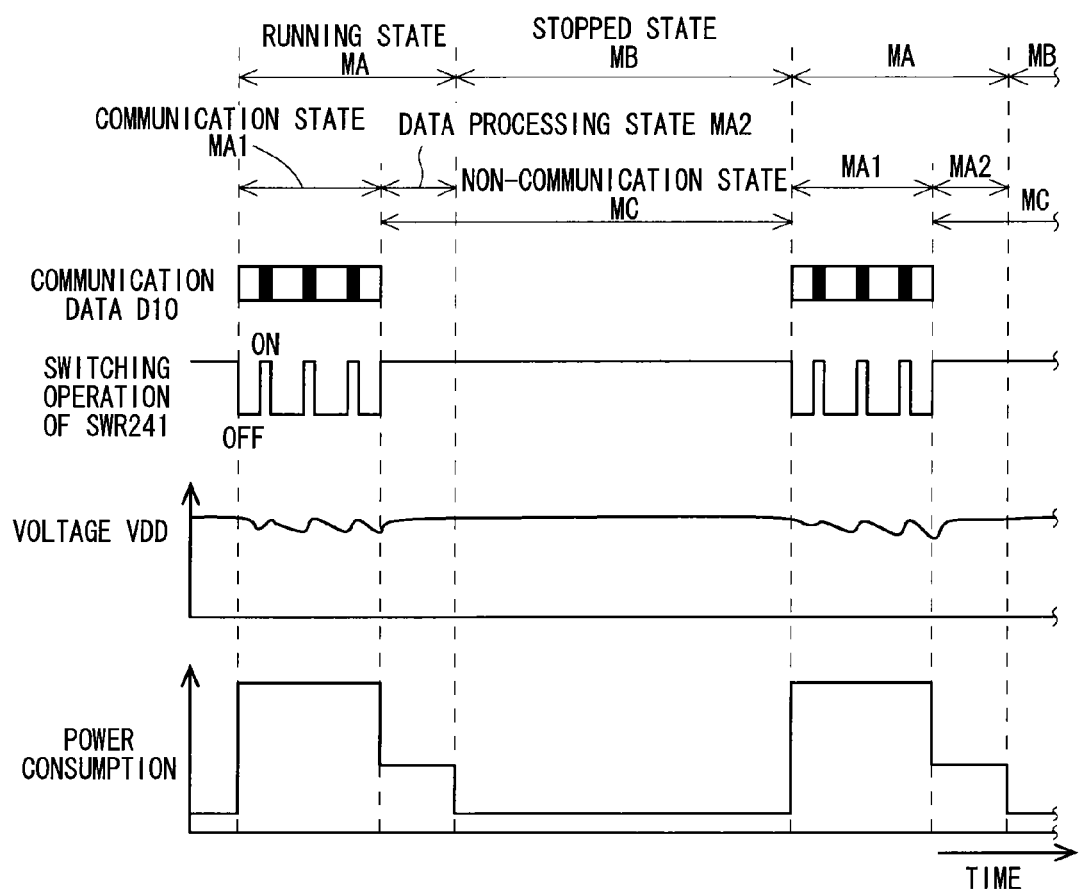

F I G. 1 7
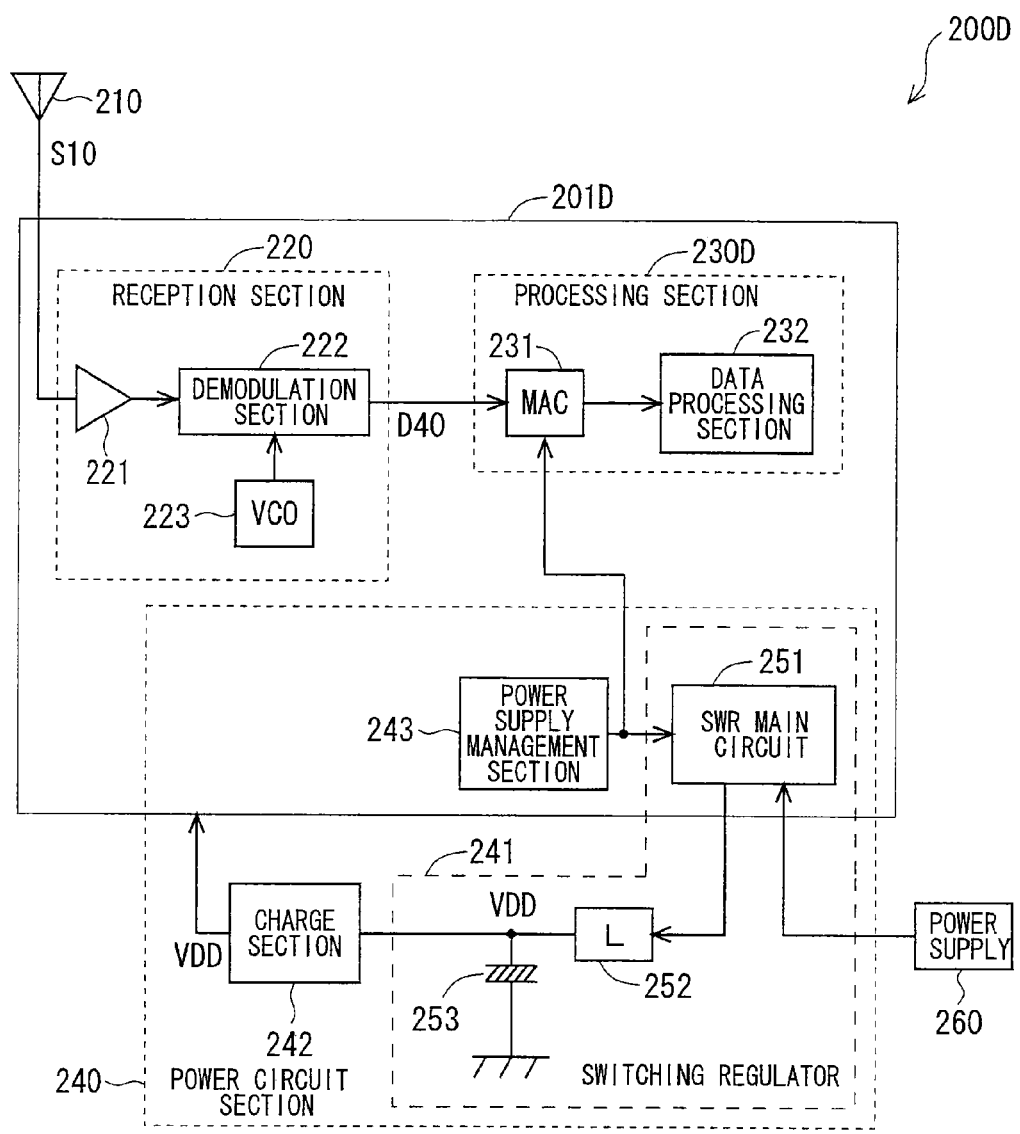

COMMUNICATION SYSTEM, COMMUNICATION APPARATUS, AND COMMUNICATION INTEGRATED CIRCUIT

TECHNICAL FIELD

The present invention relates to a communication system, a communication apparatus, and a communication integrated circuit.

BACKGROUND ART

Patent Document 1 listed below discloses a communication apparatus having a battery charger built therein. The battery charger includes an AC/DC converter for converting an AC voltage of AC100V that is supplied through a plug blade into a DC voltage having a predetermined voltage. The AC/DC converter is configured by using a switching regulator. The AC/DC converter performs a voltage conversion operation while a telephone main body block is not performing a reception operation, and at a time point when the telephone main body block starts the reception operation, stops the voltage conversion operation. According to the disclosure, this can prevent transmission and reception from being adversely affected by noise resulting from the switching regulator.

Patent Document 2 listed below discloses a radio selective calling receiver. A power circuit of this receiver includes a DC/DC converter. Until the receiver is synchronized with a POCSAG (Post Office Code Standardization Advisory group) signal, the DC/DC converter is turned on only for a last few msec immediately before a radio section of the receiver is turned on. On the other hand, after the receiver is synchronized with the POCSAG signal, the DC/DC converter is turned on a time period for receiving a synchronization signal in second and subsequent batches. The radio section is configured to receive a synchronization signal in a first batch but not to receive synchronization signals in the second and subsequent batches (that is, to be turned off). In this manner, when the radio section is in on-state, the DC/DC converter is turned off. According to the disclosure, this can eliminate an influence of noise caused by switching of the DC/DC converter.

PRIOR-ART DOCUMENTS

Patent Documents

Patent Document 1: Japanese Patent Application Laid-Open No. 7-87678 (1995)
Patent Document 2: Japanese Patent Application Laid-Open No. 6-53883 (1994)

SUMMARY OF THE INVENTION

Problems to be Solved by the Invention

As described above, an apparatus installed with a switching regulator involves a problem of noise that occurs when the switching regulator operates. Against this problem, the apparatuses of the Patent Documents 1 and 2 take such measures that the switching regulator is not operated during communication as described above.

An object of the present invention is to provide a communication system with measures against noise applied thereto based on an approach completely different from those in the apparatuses of the Patent Documents 1 and 2.

Also, an object of the present invention is to provide a communication apparatus and a communication integrated circuit that enables establishment of the above-mentioned communication system.

Means for Solving the Problems

A communication system according to a first aspect of the present invention includes: a first communication apparatus configured to generate and transmit communication data in accordance with a predetermined protocol; and a second communication apparatus including a power circuit section having a switching regulator, and configured to receive the communication data transmitted from the first communication apparatus. The predetermined protocol includes a protocol defining that at least one portion of a bit sequence constituting the communication data should be associated with an operation of the switching regulator. In a state where the communication data is received, the second communication apparatus causes the switching regulator to operate within a time period in which the at least one portion of the communication data is received.

A communication system according to a second aspect is the communication system according to the first aspect mentioned above, in which: the predetermined protocol includes a protocol defining that dummy data should be set in the at least one portion of the communication data; and the second communication apparatus removes the at least one portion from the communication data received, to modify the communication data.

A communication system according to a third aspect is the communication system according to the first aspect mentioned above, in which the second communication apparatus performs an error correction adopted in advance on the at least one portion of the communication data received.

A communication system according to a fourth aspect is the communication system according to the third aspect mentioned above, in which: the at least one portion of the communication data is a plurality of portions; the predetermined protocol includes a protocol defining that data set in one portion among the plurality of portions of the communication data should be processed in accordance with a processing method adopted in advance and data obtained as a result of the processing should be set in a remaining portion among the plurality of portions; the second communication apparatus reverse-processes the data set in the remaining portion of the communication data received, in accordance with the processing method; and the second communication apparatus performs the error correction by using data obtained as a result of the reverse-processing and the data set in the one portion of the communication data.

A communication system according to a fifth aspect is the communication system according to any one of the first to fourth aspects mentioned above, in which the first communication apparatus transmits the at least one portion of the communication data with greater power than a portion other than the at least one portion.

A communication system according to a sixth aspect is the communication system according to any one of the first to fifth aspects mentioned above, in which the second communication apparatus causes the switching regulator to operate also in a state where the communication data is not received.

A communication system according to a seventh aspect is the communication system according to any one of the first to sixth aspects mentioned above, in which the power circuit section of the second communication apparatus further includes a charge section configured to charge power generated by the switching regulator and to supply the charged power to a predetermined element of the apparatus.

A communication system according to an eighth aspect is the communication system according to the seventh aspect mentioned above, in which the charge section is a capacitor.

A communication system according to a ninth aspect includes: a first communication apparatus configured to generate and transmit communication data; and a second communication apparatus including a power circuit section having a switching regulator, and configured to receive the communication data transmitted from the first communication apparatus. The first communication apparatus generates the communication data by dividing a bit sequence constituting original data of the communication data into a plurality of blocks and arranging the plurality of blocks such that each of the plurality of blocks successively appears at least twice. The second communication apparatus causes the switching regulator to operate in a state where the communication data is received. The second communication apparatus restores the original data by extracting the plurality of blocks from the communication data while avoiding, on a unit basis of the block, a portion received during a noise influence period among the communication data received, the noise influence period being determined in accordance with a switching operation of the switching regulator.

A communication system according to a tenth aspect is the communication system according to the ninth aspect mentioned above, in which a succession of at least two the blocks are receivable in at least one of a first noise avoidance period and a second noise avoidance period in one cycle of the switching operation, the first noise avoidance period being a portion of an ON-time period excluding the noise influence period, the second noise avoidance period being a portion of an OFF-time period excluding the noise influence period.

A communication system according to an eleventh aspect includes: a first communication apparatus configured to generate and transmit communication data; and a second communication apparatus including a power circuit section having a switching regulator, and configured to receive the communication data transmitted from the first communication apparatus. The first communication apparatus generates the communication data by dividing a bit sequence constituting original data of the communication data into a plurality of blocks and arranging the plurality of blocks such that each of the plurality of blocks successively appears at least twice. The second communication apparatus causes the switching regulator to operate in a state where the communication data is received. The second communication apparatus restores the original data by extracting the plurality of blocks from the communication data while avoiding, on a unit basis of a sub-block, a portion received during a noise influence period among the communication data received, the sub-block being obtained by subdividing the block, the noise influence period being determined in accordance with a switching operation of the switching regulator.

A communication system according to a twelfth aspect is the communication system according to the eleventh aspect mentioned above, in which: the sub-block is obtained by equally dividing the block into two parts; and a succession of at least three the sub-blocks are receivable in at least one of a first noise avoidance period and a second noise avoidance period in one cycle of the switching operation, the first noise avoidance period being a portion of an ON-time period excluding the noise influence period, the second noise avoidance period being a portion of an OFF-time period excluding the noise influence period.

A communication system according to a thirteenth aspect is the communication system according to any one of the first to twelfth aspects mentioned above, in which: the second communication apparatus further includes a sensor section; and the second communication apparatus generates communication data concerning a result detected by the sensor section, and transmits the communication data to the first communication apparatus.

A communication system according to a fourteenth aspect is the communication system according to any one of the first to thirteenth aspects mentioned above, in which the second communication apparatus is configured such that an output voltage of the switching regulator is outputtable to the outside of the second communication apparatus, and the second communication apparatus is usable as a power unit with communication function.

A communication system according to a fifteenth aspect is the communication system according to any one of the first to fourteenth aspects mentioned above, in which the second communication apparatus further includes an LED illumination section that is driven by an output voltage of the switching regulator, and the second communication apparatus is usable as an illumination apparatus with communication function.

A communication system according to a sixteenth aspect is the communication system according to any one of the first to fifteenth aspects mentioned above, in which: the second communication apparatus further includes: a voltage measurement section and a current measurement section configured to measure an output voltage and an output current of a solar cell; and an MPPT (Maximum Power Point Tracking) section configured to control the switching operation of the switching regulator such that the voltage and the current measured by the voltage measurement section and the current measurement section can be set to a voltage and a current that give a maximum power point. The second communication apparatus is usable as a power unit with MPPT and communication functions.

A communication apparatus according to a seventeenth aspect includes: a reception section configured to receive a transmission signal that transmits communication data generated in accordance with a predetermined protocol, and restore the communication data from the transmission signal; a processing section configured to perform a predetermined process by using the communication data restored; and a power circuit section including a switching regulator. The predetermined protocol includes a protocol defining that at least one portion of a bit sequence constituting the communication data should be associated with an operation of the switching regulator. The reception section restores and outputs the communication data to the processing section in real time along with reception of the transmission signal. The processing section detects the at least one portion of the communication data in accordance with the predetermined protocol, and causes the switching regulator to operate in a time period in which the at least one portion is obtained from the reception section.

A communication apparatus according to an eighteenth aspect includes: a processing section configured to generate communication data in accordance with a predetermined protocol; and a transmission section configured to generate and transmit a transmission signal for transmitting the communication data. The predetermined protocol includes a protocol defining that at least one portion of a bit sequence constituting the communication data should be associated with an operation of a switching regulator provided in a power circuit section of an apparatus that is configured to receive the transmission signal. The processing section controls the transmission section such that the at least one portion of the communication data is transmitted with greater power than a portion other than the at least one portion.

A communication apparatus according to a nineteenth aspect includes: a processing section configured to generate communication data; and a transmission section configured to generate and transmit a transmission signal for transmitting the communication data. The processing section generates the communication data by dividing a bit sequence constituting original data of the communication data into a plurality of blocks and arranging the plurality of blocks such that each of the plurality of blocks successively appears at least twice.

A communication apparatus according to a twentieth aspect includes: a reception section configured to receive a transmission signal that transmits communication data, and restore the communication data from the transmission signal; a processing section configured to perform a predetermined process by using the communication data restored; and a power circuit section including a switching regulator. The communication data is structured by dividing a bit sequence constituting original data of the communication data into a plurality of blocks and arranging the plurality of blocks such that each of the plurality of blocks successively appears at least twice. The power circuit section causes the switching regulator to operate in a state where the communication data is received. The processing section restores the original data by extracting the plurality of blocks from the communication data while avoiding, on a unit basis of the block, a portion received during a noise influence period among the communication data received, the noise influence period being determined in accordance with a switching operation of the switching regulator.

A communication apparatus according to a twenty-first aspect includes: a reception section configured to receive a transmission signal that transmits communication data, and restore the communication data from the transmission signal; a processing section configured to perform a predetermined process by using the communication data restored; and a power circuit section including a switching regulator. The communication data is structured by dividing a bit sequence constituting original data of the communication data into a plurality of blocks and arranging the plurality of blocks such that each of the plurality of blocks successively appears at least twice. The power circuit section causes the switching regulator to operate in a state where the communication data is received. The processing section restores the original data by extracting the plurality of blocks from the communication data while avoiding, on a unit basis of a sub-block, a portion received during a noise influence period among the communication data received, the sub-block being obtained by subdividing the block, the noise influence period being determined in accordance with a switching operation of the switching regulator.

A communication integrated circuit according to a twenty-second aspect is a communication integrated circuit adoptable in a communication apparatus including a switching regulator provided in a power circuit section. The communication integrated circuit includes: a reception section configured to receive a transmission signal that transmits communication data generated in accordance with a predetermined protocol, and restore the communication data from the transmission signal; and a processing section configured to perform a predetermined process by using the communication data restored. The predetermined protocol includes a protocol defining that at least one portion of a bit sequence constituting the communication data should be associated with an operation of the switching regulator. The reception section restores and outputs the communication data to the processing section in real time along with reception of the transmission signal. The processing section detects the at least one portion of the communication data in accordance with the predetermined protocol, and outputs a control signal for operating the switching regulator in a time period in which the at least one portion is obtained from the reception section.

A communication integrated circuit according to a twenty-third aspect is a communication integrated circuit adoptable in a communication apparatus including a switching regulator provided in a power circuit section. The communication integrated circuit includes: a reception section configured to receive a transmission signal that transmits communication data, and restore the communication data from the transmission signal; and a processing section configured to perform a predetermined process by using the communication data restored. The communication data is structured by dividing a bit sequence constituting original data of the communication data into a plurality of blocks and arranging the plurality of blocks such that each of the plurality of blocks successively appears at least twice. The processing section restores the original data data by extracting the plurality of blocks from the communication while avoiding, on a unit basis of the block, a portion received during a noise influence period among the communication data received while the switching regulator is in operation, the noise influence period being determined in accordance with a switching operation of the switching regulator.

A communication integrated circuit according to a twenty-fourth aspect is a communication integrated circuit adoptable in a communication apparatus including a switching regulator provided in a power circuit section. The communication integrated circuit includes: a reception section configured to receive a transmission signal that transmits communication data, and restore the communication data from the transmission signal; and a processing section configured to perform a predetermined process by using the communication data restored. The communication data is structured by dividing a bit sequence constituting original data of the communication data into a plurality of blocks and arranging the plurality of blocks such that each of the plurality of blocks successively appears at least twice. The processing section restores the original data by extracting the plurality of blocks from the communication data while avoiding, on a unit basis of a sub-block, a portion received during a noise influence period among the communication data received while the switching regulator is in operation, the sub-block being obtained by subdividing the block, the noise influence period being determined in accordance with a switching operation of the switching regulator.

A communication integrated circuit according to a twenty-fifth aspect is the communication integrated circuit according to any one of the twenty-second to twenty-fourth aspects mentioned above, further including at least a part of the power circuit section.

A communication integrated circuit according to a twenty-sixth aspect includes: a processing section configured to generate communication data in accordance with a predetermined protocol; and a transmission section configured to generate and transmit a transmission signal that transmits the communication data. The predetermined protocol includes a protocol defining that at least one portion of a bit sequence constituting the communication data should be associated with an operation of a switching regulator provided in a power circuit section of an apparatus that is configured to receive the transmission signal. The processing section controls the transmission section such that the at least one portion of the communication data is transmitted with greater power than a portion other than the at least one portion.

A communication integrated circuit according to a twenty-seventh aspect includes: a processing section configured to generate communication data; and a transmission section configured to generate and transmit a transmission signal for transmitting the communication data. The processing section generates the communication data by dividing a bit sequence constituting original data of the communication data into a plurality of blocks and arranging the plurality of blocks such that each of the plurality of blocks successively appears at least twice.

Effects of the Invention

In the first, seventeenth, twenty-second, and twenty-fifth aspects mentioned above, the second communication apparatus, in the state where the communication data is received, causes the switching regulator to operate in the time period in which the at least one portion of the communication data that is defined in advance by the protocol is received. That is, a time period for operating the switching regulator during the reception of the communication data is determined in advance. Accordingly, it is presupposed that, among the communication data, the at least one portion described above would be affected by noise caused by the operation of the switching regulator. Therefore, various measures against noise can be taken for the above-described at least one portion of the communication data. Thereby, deterioration in communication quality can be prevented.

Particularly, in the second aspect mentioned above, in the second communication apparatus, the above-described at least one portion of the received communication data is discarded. Accordingly, even if noise is superimposed on the at least one portion, communication quality is not deteriorated.

In the third aspect mentioned above, due to the adoption of the error correction, deterioration in communication quality can be prevented.

In the fourth aspect mentioned above, a resistance to noise is improved, and deterioration in communication quality is more surely prevented. The reason therefor is as follows. That is, in a case where the switching operation of the switching regulator occurs at the same timing every time, there is a possibility that data corruption will occur in the identical bit positions in the respective plurality of portions (corresponding to the at least one portion described above) of the communication data. Accordingly, in a case where the same data is set in the plurality of portions described above, the error correction may have an inappropriate result. However, the fourth aspect mentioned above can avoid such a failure.

In the fifth, eighteenth, and twenty-sixth aspects mentioned above, the first communication apparatus increases the transmission power for transmitting the above-described at least one portion of the communication data, and thereby a noise resistance of the at least one portion is enhanced. That is, a signal level of the at least one portion is set to such a level that data can be identified even if noise is superimposed thereon. Thus, an influence of the noise can be made negligible. Thus, deterioration in communication quality can be prevented.

In the sixth aspect mentioned above, a temporal bias in power generation is reduced, as compared with a case where the switching regulator is operated only in the state where the communication data is received. Therefore, the power supply can be stabilized.

In the seventh aspect mentioned above, due to the adoption of the charge section, the power supply can be stabilized.

In the eighth aspect mentioned above, downsizing, weight reduction, and cost reduction of the charge section are allowed. As a result, downsizing, and the like, of the second communication apparatus are allowed.

In the ninth, nineteenth, twentieth, twenty-third, and twenty-seventh aspects mentioned above, the second communication apparatus causes the switching regulator to operate in the state where the communication data is received, and among the received communication data, the portion received during the noise influence period that is determined in accordance with the switching operation of the switching regulator is not used for the restoration of the original data. The first communication apparatus generates and transmits communication data having a data structure suitable for such an operation of the second communication apparatus. Therefore, even though the switching regulator is operated during the reception of the communication data, deterioration in communication quality is prevented. Particularly, it is not necessary to synchronize the switching operation of the switching regulator with a predetermined portion of the communication data. Therefore, the configuration of the apparatus can be simplified.

In the tenth aspect mentioned above, the extraction of each divided block is more surely performed.

In the eleventh, nineteenth, twenty-first, twenty-fourth, and twenty-seventh aspects mentioned above, the same effects as those of the ninth aspect mentioned above are obtained. Moreover, since the portion received during the noise influence period is selected on a unit basis of the sub-block that is obtained by subdividing the block, a portion not used for the extraction of each divided block can be reduced as compared with the ninth aspect mentioned above. Accordingly, the number of times each block successively appears is suppressed, and thus a data efficiency of the communication data can be improved.

In the twelfth aspect mentioned above, the same effects as those of the tenth aspect mentioned above are obtained.

In the thirteenth aspect mentioned above, the communication system according to the present invention is applicable to a sensor system.

In the fourteenth aspect mentioned above, the communication system according to the present invention is applicable to a power unit with communication function.

In the fifteenth aspect mentioned above, the communication system according to the present invention is applicable to an illumination apparatus with communication function.

In the sixteenth aspect mentioned above, the communication system according to the present invention is applicable to a power unit with MPPT and communication functions.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 A timing chart showing an outline of an operation of the second communication apparatus according to the first embodiment.

FIG. 5 A timing chart showing the outline of the operation of the second communication apparatus according to the first embodiment.

FIG. 6 A diagram showing an outline of a structure of communication data according to the first embodiment.

FIG. 12 A timing chart showing an outline of an operation of the first communication apparatus according to the second embodiment.

FIG. 13 A timing chart showing an outline of an operation of a second communication apparatus according to a third embodiment.

FIG. 17 A block diagram showing an outline of a configuration of a second communication apparatus according to the fifth embodiment.

EMBODIMENT FOR CARRYING OUT THE INVENTION

First Embodiment

Communication System 10

Figure 1:
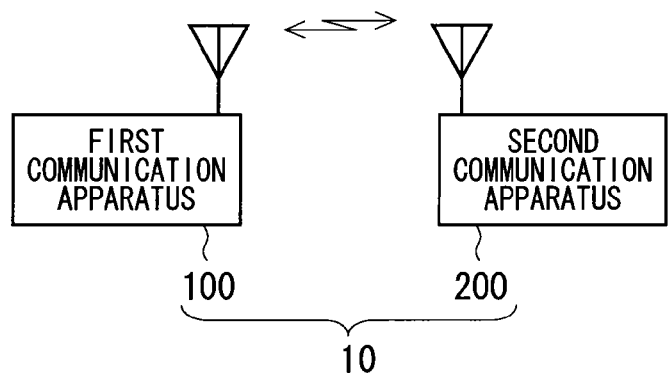
FIG. 1 A block diagram showing an outline of a configuration of a communication system according to a first embodiment.

FIG. 1 is a block diagram showing an outline of a communication system 10 according to a first embodiment. The communication system 10 illustrated in FIG. 1 includes a first communication apparatus 100 and a second communication apparatus 200. In the following, the first communication apparatus 100 may be simply referred to as a communication apparatus 100, and the second communication apparatus 200 may be simply referred to as a communication apparatus 200. In a case illustrated herein, each of the number of the communication apparatuses 100 and the number of the communication apparatuses 200 is one. However, the numbers of the communication apparatuses 100 and 200 are not limited to the illustrated one.

The communication apparatuses 100 and 200 are configured to perform wireless communication. Although a case where the first communication apparatus 100 is a transmit-only apparatus and the second communication apparatus 200 is a receive-only apparatus is illustrated herein, this illustration is not restrictive. That is, the first communication apparatus 100 has at least a transmission function, and may have a reception function in addition to the transmission function. Likewise, the second communication apparatus 200 has at least a reception function, and may have a transmission function in addition to the reception function.

<First Communication Apparatus 100>

Figure 2:
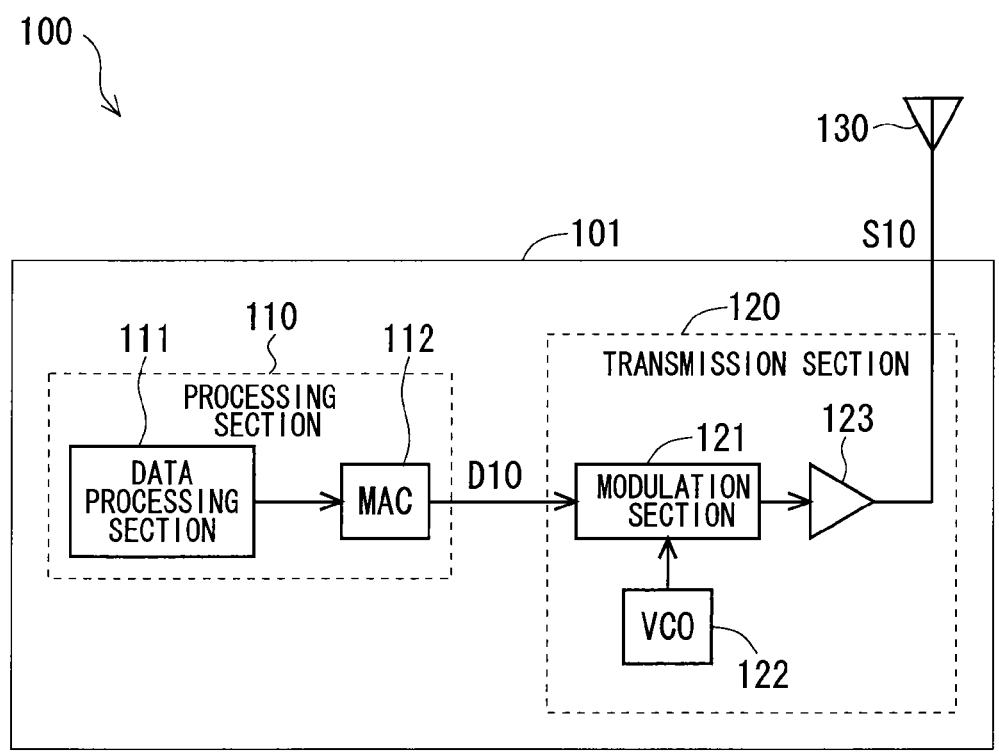
FIG. 2 A block diagram showing an outline of a configuration of a first communication apparatus according to the first embodiment.

FIG. 2 illustrates a block diagram showing an outline of the first communication apparatus 100. The communication apparatus 100 illustrated in FIG. 2 includes a processing section 110, a transmission section 120, and an antenna 130.

<Processing Section 110>

The processing section 110 is configured to perform various processes, such as calculations and controls, in the first communication apparatus 100. Examples of the various processes include a process for generating communication data D10 in accordance with a predetermined protocol (described later). In the example shown in FIG. 2, the processing section 110 includes a data processing section 111 and a MAC (Media Access Control; media access control layer) 112.

The data processing section 111 is configured to perform various kinds of data processing. The data processing section 111 can be configured to include, for example, a micro computer (in other words, a micro processor) and a memory.

In this exemplary configuration, the various processes performed by the data processing section 111 can be implemented in software. More specifically, the micro computer executes each of process steps (in other words, procedures) described in a program. Accordingly, the micro computer functions as various means corresponding to the process steps, or the micro computer implements various functions corresponding to the process steps. A plurality of micro computers may be employed. In such a case, the micro computer mentioned above represents a general term for the plurality of micro computers.

The memory can be configured with, for example, one or more of a ROM (Read Only Memory), a RAM (Random Access Memory), and a rewritable non-volatile memory (such as an EPROM (Erasable Programmable ROM)). The memory stores various kinds of data (in other words, information), programs executable by the data processing section 111, and the like, and also provides a work area for the execution of the programs.

Here, it may be also possible that the various means or the various functions implemented by the data processing section 111 are partially or wholly implemented in hardware.

The MAC 112 is configured to provide a data link layer (second layer) of the so-called OSI (Open System Interconnection) reference model, and more specifically a lower sub-layer in the data link layer. Similarly to an ordinary MAC layer, the MAC 112 can be implemented in hardware.

Here, in terms of a relationship with the MAC 112, it can be recognized that the data processing section 111 provides an upper layer above the data link layer (second layer) of the OSI reference model and the transmission section 120 provides a physical layer (first layer) of the OSI reference model. In some cases, the antenna 130 may be added to the first layer.

The MAC 112 obtains, from the data processing section 111, communication data (here, corresponding to a packet that is a PDU (protocol data unit) in a third layer of the OSI reference model) generated by the data processing section 111. Then, the MAC 112 performs a predetermined process (for example, an ordinary information adding process) on the obtained communication data. Then, the MAC 112 outputs communication data (here, corresponding to a frame that is a PDU in the second layer of the OSI reference model) D10 obtained after the predetermined process. In the example shown in FIG. 2, the communication data D10 outputted from the MAC 112 corresponds to output data from the processing section 110.

<Transmission Section 120 and Antenna 130>

The transmission section 120 is configured to obtain the communication data D10 generated by the processing section 110, and generate and output a transmission signal S10 for wirelessly transmitting the communication data D10. In the example shown in FIG. 2, the transmission section 120 includes a modulation section 121, a voltage controlled oscillator (hereinafter, also referred to as "VCO") 122, and a power amplifier (hereinafter, also referred to as "PA") 123.

The modulation section 121 is configured to obtain the communication data D10 outputted from the processing section 110 and performs a signal modulation on the communication data D10 in a predetermined modulation scheme that has been adopted in advance. Non-limiting examples of the modulation scheme include ASK (Amplitude Shift Keying), FSK (Frequency Shift Keying), and PSK (Phase Shift Keying).

In the example shown in FIG. 2, the VCO 122 is configured to oscillate a signal that is used as a carrier wave by a modulation process performed by the modulation section 121, and supply the oscillated signal to the modulation section 121. Instead of the VCO 122, an oscillator other than the VCO may be adopted.

The PA 123 is configured to amplify the power of the transmission signal outputted from the modulation section 121, and output the amplified transmission signal S10. The transmission signal S10 is wirelessly transmitted via the antenna 130.

The PA 123 is one example of a power adjustment section for adjusting transmission power of the transmission signal S10 that is transmitted via the antenna 130. That is, instead of the PA 123, an attenuator may be mentioned as another example of the power adjustment section. Additionally, a configuration capable of both amplification and attenuation may be mentioned as still another example of the power adjustment section.

<Communication Integrated Circuit 101>

FIG. 2 illustrates a case where all the elements of the processing section 110 and all the elements of the transmission section 120 are provided in one communication integrated circuit 101.

<Second Communication Apparatus 200>

Figure 3:
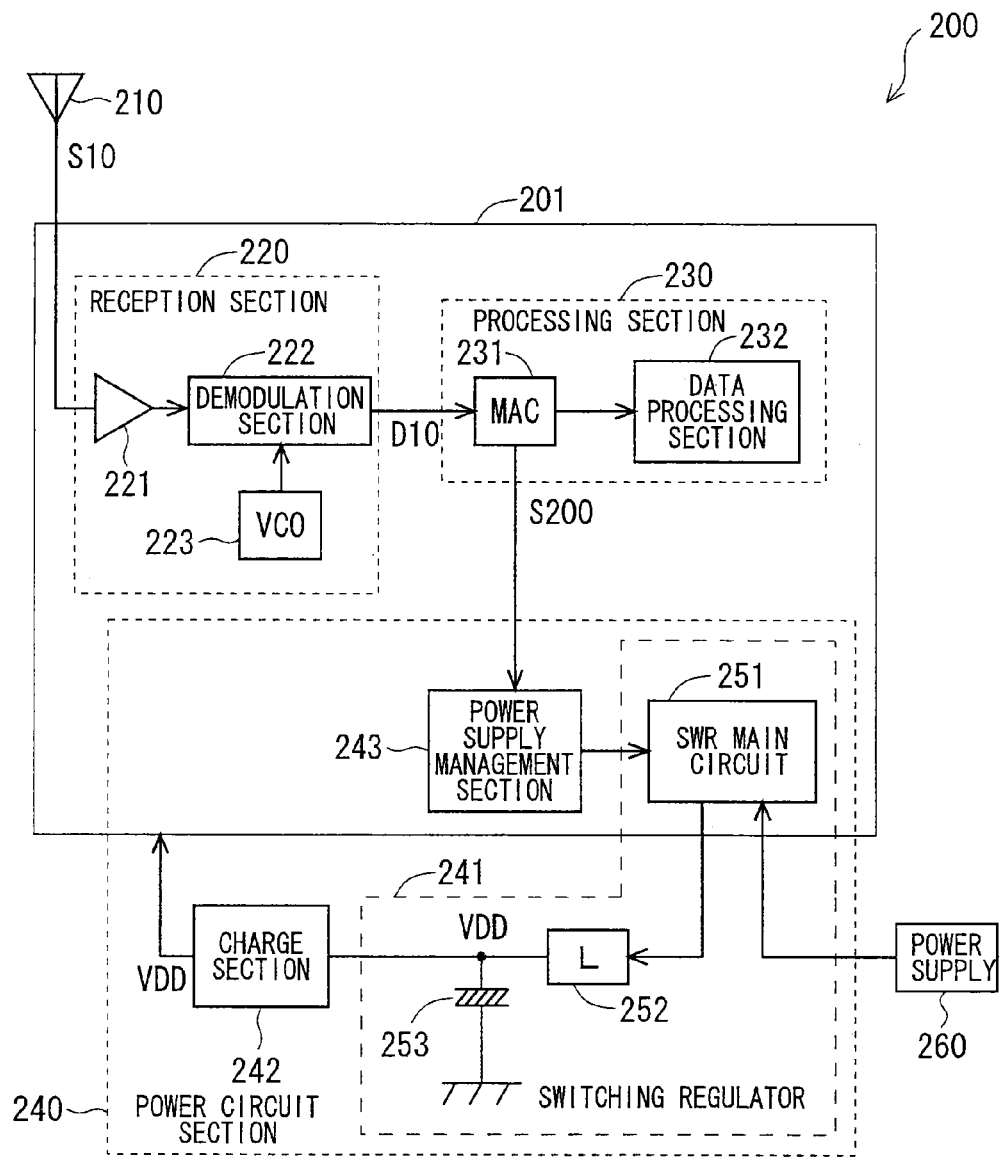
FIG. 3 A block diagram showing an outline of a configuration of a second communication apparatus according to the first embodiment.

FIG. 3 illustrates a block diagram showing an outline of the second communication apparatus 200. The communication apparatus 200 illustrated in FIG. 3 includes an antenna 210, a reception section 220, a processing section 230, a power circuit section 240, and a power supply 260.

<Antenna 210 and Reception Section 220>

The antenna 210 is used for receiving the transmission signal S10 wirelessly transmitted from the first communication apparatus 100. The reception section 220 is configured to receive the transmission signal S10 via the antenna 210, restore the communication data D10 from the received transmission signal S10, and output the restored communication data D10. In the example shown in FIG. 3, the reception section 220 includes a low noise amplifier (hereinafter, also referred to as "LNA") 221, a demodulation section 222, and a VCO 223.

The LNA 221 is configured to amplify and output the received transmission signal S10. Since the signal S10 that has been wirelessly transmitted is often weak, the LNA 221 that is a low noise type amplifier is suitable.

The demodulation section 222 is configured to obtain the transmission signal S10 amplified by the LNA 221, and demodulate the signal S10 in accordance with the modulation scheme adopted by the modulation section 121 (see FIG. 2). The communication data D10 is restored from the transmission signal S10 by a demodulation process performed by the demodulation section 222. In the example of FIG. 3, the communication data D10 outputted from the demodulation section 222 corresponds to output data from the reception section 220, which is inputted to the processing section 230.

In the example of FIG. 3, the VCO 223 is configured to oscillate and then output a signal having the same frequency as that of the carrier wave used for the transmission signal S10. This oscillated signal is supplied to the demodulation section 222, for use in the demodulation process performed by the demodulation section 222. Instead of the VCO 223, an oscillator other than VCO may be adopted.

In the reception section 220, the restoration and output of the communication data D10 is executed in real time, that is, promptly and continuously, upon reception of the transmission signal S10. Therefore, the processing section 230 can obtain the communication data D10 included in the transmission signal S10 substantially simultaneously with reception of the transmission signal S10.

<Processing Section 230>

The processing section 230 is configured to perform various processes, such as calculations and controls, in the second communication apparatus 200. Examples of the various processes include a process of obtaining the communication data D10 restored by the reception section 220 and using the communication data D10, such as a predetermined calculation, control, or the like, that is executed in accordance with a command included in the received communication data D10. In the example of FIG. 3, the processing section 230 includes a MAC 231 and a data processing section 232.

The MAC 231 is configured to provide a data link layer (second layer) of the so-called OSI reference model, and more specifically a lower sub-layer in the data link layer. Similarly to an ordinary MAC, the MAC 231 can be implemented in hardware.

Here, in terms of a relationship with the MAC 231, it can be recognized that the data processing section 232 provides an upper layer above the data link layer (second layer) of the OSI reference model and the reception section 220 provides a physical layer (first layer) of the OSI reference model. In some cases, the antenna 210 may be added to the first layer.

The MAC 231 obtains, from the reception section 220, the communication data D10 (here, corresponding to a frame that is a PDU in the second layer) restored by the reception section 220. Then, the MAC 231 performs a predetermined process (for example, an ordinary added information removing process) on the obtained communication data D10. Then, the MAC 231 outputs communication data (here, corresponding to a packet that is a PDU in a third layer) obtained after the predetermined process, to the data processing section 232.

Additionally, the MAC 231 is configured to output a control signal S200 that controls the power circuit section 240 based on the restored communication data D10 (described later).

The data processing section 232 is configured to perform various kinds of data processing. The data processing section 232 can be configured to include, for example, a micro computer and a memory, similarly to the data processing section 111 of the first communication apparatus 100 (see FIG. 2). Here, it may be also possible that the various means or the various functions implemented by the data processing section 232 are partially or wholly implemented in hardware.

<Power Circuit Section 240 and Power Supply 260>

The power circuit section 240 is configured to generate various voltages for use in the second communication apparatus 200, from an output voltage of the power supply 260. The generated various voltages are respectively supplied to predetermined elements in the second communication apparatus 200. As the power supply 260, for example, a cell (either of a primary cell and a secondary cell is acceptable), a solar cell, and the like, may be adopted.

The power circuit section 240 illustrated in FIG. 3 includes a switching regulator (hereinafter, also referred to as "SWR") 241, charge section 242, and a power supply management section 243. Here, for simplification of the description, a case where the number of the SWRs 241 is one, in other words, a case where the number of kinds of voltages generated by the power circuit section 240 is one, will be illustrated. However, this example is not limiting, and it may be also possible to provide a plurality of the SWRs 241 in the power circuit section 240.

Switching regulators having various configurations are adoptable as the SWR 241. A switching regulator has a higher voltage conversion efficiency than that of a series regulator, and therefore contributes to a long-time use of the power supply 260. Moreover, while the series regulator is capable of only step-down, the switching regulator can be configured for not only step-down but also step-up. Therefore, the switching regulator can generate a predetermined voltage even in a state where the output voltage of the power supply 260 is lowered. In view of this point as well, the switching regulator contributes to a long-time use of the power supply 260. Additionally, because of a step-up function, a power supply having a lower output voltage is adoptable as the power supply 260. This allows downsizing, weight reduction, and cost reduction of the power supply 260.

In the example of FIG. 3, for simplification of the description, the SWR 241 is divided broadly into a SWR main circuit 251, an inductor (in the drawing, denoted by "L") 252, and a capacitor 253. In other words, circuit elements constituting the SWR 241 except the inductor 252 and the capacitor 253 are collectively referred to as the SWR main circuit 251. In the example of FIG. 3, the SWR main circuit 251 is connected to the power supply 260 and to one end of the inductor 252, and the other end of the inductor 252 is connected to one end of the capacitor 253 and to the charge section 242, and the other end of the capacitor 253 is grounded.

The SWR main circuit 251 includes, for example, a switching section (configurable to include a switching element such as a transistor, for example) for turning on/off a current path extending from the power supply 260 to the inductor 252, and a switching control section (configurable with an oscillator, for example) for controlling on/off of the switching section.

When the aforesaid switching section is in on-state, power (in other words, electric energy) supplied from the power supply 260 via the SWR main circuit 251 is accumulated in the inductor 252. When the aforesaid switching section is in off-state, the power accumulated in the inductor 252 is transferred to the charge section 242. In this energy transfer, an output voltage of the inductor 252 is smoothed by the capacitor 253.

The charge section 242 is arranged to charge the power generated by the SWR 241, and supply the charged power to a predetermined element in the second communication apparatus 200. In the example of FIG. 3, an output voltage VDD of the charge section 242 is supplied to an integrated circuit 201 which will be described later. The charge section 242 is configurable with, for example, various secondary cells, capacitors, or the like.

Adopting a capacitor as the charge section 242 allows more downsizing, weight reduction, and cost reduction of the charge section 242, as compared with adopting a secondary cell. As a result, downsizing, and the like, of the second communication apparatus 200 are allowed. Moreover, the capacitor serving as the charge section 242 and the smoothing capacitor 253 can be collectively configured as a single capacitor. This can further promote the downsizing and the like.

It may be also possible that the charge section 242 is not provided and the SWR 241 is always operated to give the power supply. However, from the viewpoint of an influence of noise caused by a switching operation of the SWR 241, power consumption of the SWR 241, and the like, it is not practical to constantly run the SWR 241. Additionally, the charge section 242 enables a stable power supply even in a time period in which the SWR 241 is stopped.

The power supply management section 243 is connected to the SWR main circuit 251, and manages an operation of the SWR main circuit 251. For example, the power supply management section 243 gives set values of an on/off frequency, an on/off duty cycle, and the like, of the aforesaid switching section, to the aforesaid switching control section.

Also, for example, the power supply management section 243 controls running/stopping of the SWR main circuit 251, and thereby controls running/stopping of the SWR 241. In the second communication apparatus 200, such a control of running/stopping can be performed by the control signal S200 outputted by the MAC 231 of the processing section 230.

<Communication Integrated Circuit 201>

FIG. 3 illustrates a case where all the elements of the reception section 220, all the elements of the processing section 230, and part of the elements (to be specific, the power supply management section 243 and the SWR main circuit 251) of the power circuit section 240 are provided in a single communication integrated circuit 201. In this example, the rest of the elements of the power circuit section 240 are provided external to the integrated circuit 201. It may be also possible that all the elements of the power circuit section 240 are provided in the integrated circuit 201, or in contrast, that none of the power circuit section 240 is provided in the integrated circuit 201 (in this case, the power circuit section 240 is provided external to the integrated circuit 201).

<Outline of Operation of Second Communication Apparatus 200>

An operation of the second communication apparatus 200 will be illustrated with reference to a timing chart of FIG. 4 in addition to FIG. 3.

In the example shown in FIG. 4, the communication apparatus 200 alternately adopts a running state MA and a stopped state MB. In other words, the communication apparatus 200 is intermittently brought into the running state MA. In the running state MA, the processing section 230 and the like perform predetermined operations, and in the stopped state MB, the processing section 230 and the like stop various operations. For example, such intermittent operations can be performed in accordance with a timer (not shown) that is provided inside or outside the processing section 230.

Instead of such intermittent operations, it is also possible to continue the running state MA without providing the stopped state MB. However, if the processing section 230 and the like stop their operations in the stopped state MB, the power consumption can be reduced (see a waveform of the power consumption in FIG. 4). Although only the stopping of the operations of the processing section 230 and the like in the stopped state MB contributes to reduction in the power consumption, adoption of a configuration in which the power supply itself to the processing section 230 and the like is stopped contributes to further power reduction.

In the example shown in FIG. 4, during a period of the running state MA, a communication state MA1 and a data processing state MA2 are switched in time division.

In the communication state MA1, the second communication apparatus 200 operates by using a wireless communication function. More specifically, the reception section 220 receives the transmission signal S10 transmitted from the first communication apparatus 100 (see FIG. 2) via the antenna 210, restores the communication data D10 from the received transmission signal S10, and outputs the restored communication data D10 to the processing section 230.

Particularly in the second communication apparatus 200, as shown in FIG. 4, the switching operation of the SWR 241 (see FIG. 3) is performed in the period of the communication state MA1. This point will be detailed later.

In the data processing state MA2, the second communication apparatus 200 performs various predetermined processes. For example, the processing section 230 performs a predetermined calculation, control, or the like, in accordance with a command included in the received communication data D10. The switching from the communication state MA1 to the data processing state MA2 can be performed, for example, upon completion of reception of the communication data D10.

Although the example shown in FIG. 4 illustrates a case where the communication state MA1 is set as the earlier, this example is not limiting. Additionally, in the example shown in FIG. 4, both states MA1 and MA2 are executed in one running state MA, it may be acceptable that these states MA1 and MA2 are executed in different running states MA. In such a case as well, both states MA1 and MA2 are executed in time division.

However, executing the two states MA1 and MA2 in one running state MA makes more contribution to improvement in the processing speed. This is because, in a case where the power supply is stopped in the stopped state MB, a time lag occurs from the power supply is restarted to an operable state is actually established. That is, the more number of times the two states MA1 and MA2 are separated into different running states MA, the more time lags mentioned above occur until a process including the states MA1 and MA2 as one pair is completed.

In the data processing state MA2, the reception section 220 can be stopped. This stopping enables the power consumption in the data processing state MA2 to be reduced as compared with in the communication state MA1 (see the waveform of the power consumption in FIG. 4).

Here, since no communication is performed in the data processing state MA2 and in the stopped state MB, these states MA2 and MA will be collectively referred to as a non-communication state MC. In this case, it can be expressed that the communication apparatus 200 alternately adopts the communication state MA1 and the non-communication state MC.

<Operation of SWR 241 and Structure of Communication Data D10>

As described above, in the second communication apparatus 200, the switching operation of the SWR 241 is performed in the period of the communication state MA1 that is a state where the transmission signal S10, in other words, the communication data D10, is received. Such an operation will be described with reference also to a timing chart of FIG. 5 that corresponds to an enlarged view of a part of FIG. 4.

Firstly, a structure of the communication data D10 used in the communication system 10 (see FIG. 1) will be described. In an example shown in FIG. 5, a header of the communication data D10 includes a preamble D11 at the beginning and a synchronization word D12 that follows the preamble D11. Then, subsequent to the header, a payload is provided.

Particularly, the communication data D10 has a specific portion D13 in the payload. This portion D13 is a data portion associated with the switching operation of the SWR 241 (see FIG. 3), and more specifically, is a data portion in which the switching operation of the SWR 241 is allowed, as will be described later. This portion D13 will be also referred to as a switching allowance portion D13.

A data structure (in other words, a format) of the communication data D10 has been defined in advance, and this definition has been given, as a communication protocol, to the communication apparatuses 100 and 200 (more specifically, the MACs 112 and 231) in advance.

This communication protocol includes a definition concerning the switching allowance portion D13. For example, this protocol includes a definition concerning the number of switching allowance portions D13 to be provided in one communication data D10. In the illustration of FIG. 5, the number of the portions D13 is two. However, the number of the portions D13 may be one, or three or more. Moreover, the protocol mentioned above includes, for example, a definition concerning the position in a bit sequence constituting the communication data D10 where the switching allowance portion D13 is to be provided, and a definition concerning the length of the portion D13.

This communication protocol is shared by the communication apparatuses 100 and 200, and thereby the first communication apparatus 100 can generate the communication data D10 in accordance with this protocol, and the second communication apparatus 200 can interpret the received communication data D10 in accordance with this protocol.

Particularly in the second communication apparatus 200, the MAC 231 of the processing section 230 performs detection of the switching allowance portion D13 in accordance with the above-mentioned protocol, on the communication data D10 that is sequentially received from the reception section 220 in the period of the communication state MA1. Then, the MAC 231 outputs, to the power supply management section 243, the control signal S200 (see FIGS. 3 and 5) indicating that the switching allowance portion D13 is currently obtained. In accordance with the control signal S200, the power supply management section 243 performs the switching operation of the SWR 241 only while the switching allowance portion D13 is being obtained. That is, by using the control signal S200, the processing section 230 causes the SWR 241 to be operated only in a time period MA1a in which the switching allowance portion D13 is obtained.

It is to be noted that FIGS. 4 and 5 shows only a broad separation between a switching operation period (in the drawing, denoted by ON level) and a switching stop period (in the drawing, denoted by OFF level) of the SWR 241. That is, in the switching operation period, the switching section of the SWR 241 is turned on/off at a predetermined frequency, but for simplification of the drawing, a detailed illustration of the on/off states is omitted.

As shown in FIG. 5, the switching operation period of the SWR 241 falls within the time period MA1a in which the switching allowance portion D13 is obtained. This relationship can be set based on various known parameters, such as a time required for the switching section to shift from the off-state to the on-state and then shift to the off-state again, a bit length of the switching allowance portion D13, and a communication speed (in other words, reception speed) of the second communication apparatus 200.

In a case illustrated in FIG. 5, the control signal S200 is in High state throughout the time period MA1a in which the switching allowance portion D13 is obtained, and is in Low state in the other time periods. However, the waveform of the signal S200 is not limited to the one shown in this example. In another possible waveform, for example, the High state and the Low state may be reversed. The time period MA1a in which the switching allowance portion D13 is obtained can be set in advance based on the various parameters, as described above. Therefore, in a possible mode, for example, only a timing at which the obtaining of the switching allowance portion D13 is started may be notified.

Here, when the switching operation of the SWR 241 is made, as schematically shown in FIG. 5, a noise NS may occur in the output voltage VDD of the power circuit section 240. In some cases, a noise other than the power supply noise NS may be caused by the switching operation of the SWR 241. Such various noises may cause a data error (so-called data corruption) in the communication data D10 received by the second communication apparatus 200.

However, as described above, a time period for operating the SWR 241 during reception of the communication data D10 is determined in advance. Accordingly, it is presupposed that the switching allowance portion D13 associated with the time period for operating the SWR 241 would be affected by the noise caused by the operation of the SWR 241. Therefore, various measures against noise can be taken for the switching allowance portion D13. Thereby, deterioration in communication quality can be prevented. In the following, specific examples of the measures against noise for the switching allowance portion D13 will be described.

First Example of Switching Allowance Portion D13

In a first example, dummy data is set in the switching allowance portion D13. A protocol that defines setting of dummy data in the switching allowance portion D13 is incorporated into the communication protocol shared by the communication apparatuses 100 and 200, and thereby such setting can be made.

According to this protocol, the first communication apparatus 100 generates and transmits the communication data D10 in which the dummy data is inserted in the switching allowance portion D13. On the other hand, the second communication apparatus 200 modifies the communication data D10 by removing the switching allowance portion D13, that is, the dummy data, from the received communication data D10. The modified communication data D10 is subjected to a subsequent process. The modification of the communication data can be performed by the MAC 231 or by the data processing section 232.

In this manner, at the receiving side, the switching allowance portion D13 is discarded from the communication data D10. Accordingly, even if data corruption in the switching allowance portion D13 is caused by the switching operation of the SWR 241, the communication quality is not deteriorated.

Second Example of Switching Allowance Portion D13

In a second example, an error correction (sometimes also referred to as "error detection correction") is applied to the switching allowance portion D13 that is a portion where data corruption may occur.

Various known techniques are adoptable for the error correction. For example, a Reed-Solomon coding scheme, a BCH coding scheme, a majority voting scheme, and the like, may be mentioned. Here, for simplification of the description, a majority voting scheme is illustrated.

Figure 7:
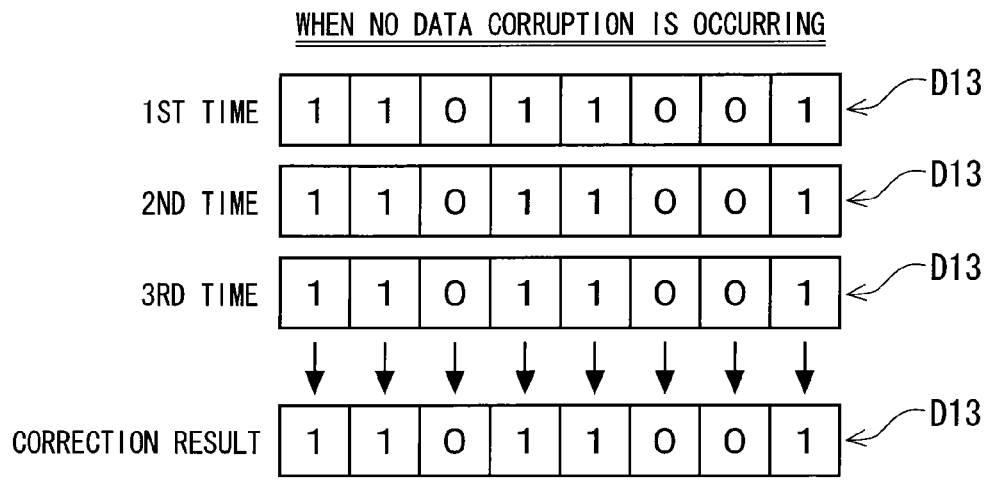
FIG. 7 A diagram showing an outline of an error correction based on a majority voting scheme according to the first embodiment.
Figure 8:
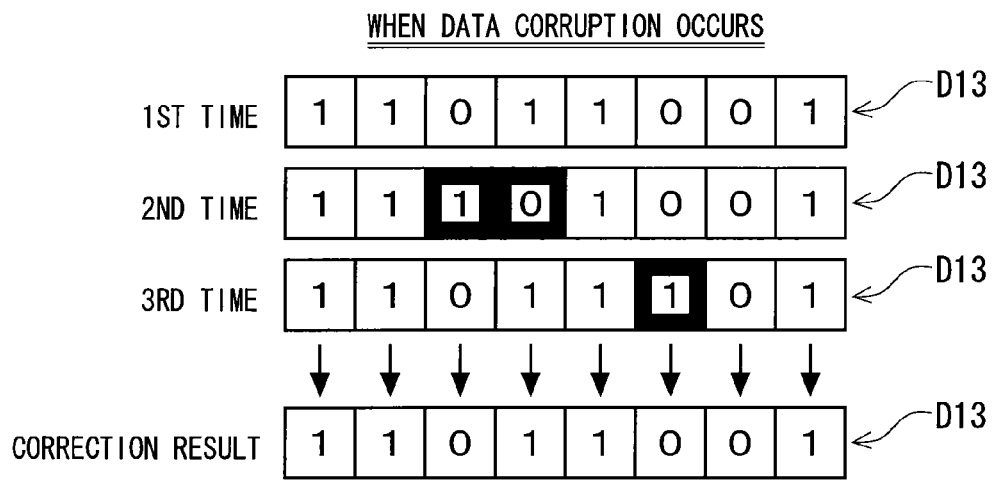
FIG. 8 A diagram showing an outline of the error correction based on the majority voting scheme according to the first embodiment.

FIG. 6 illustrates a structure of the communication data D10 based on the majority voting scheme. FIGS. 7 and 8 are schematic diagrams showing an outline of the majority voting scheme.

In an example shown in FIG. 6, in the first communication apparatus 100, the same data, in other words, the same bit sequence, is set in three switching allowance portions D13. This means that the same data is transmitted three times in one communication data D10.

In the second communication apparatus 200 having received the communication data D10 with this structure, in a case where no data corruption is occurring in the switching allowance portion D13, data of the above-mentioned three switching allowance portions D13 are coincident with one another, as illustrated in FIG. 7. On the other hand, in a case where data corruption occurs in the switching allowance portion D13, data the above-mentioned three switching allowance portions D13 are not coincident, as illustrated in FIG. 8. In FIG. 8, for easy understanding, a bit position where the data corruption occurs is enclosed by a thick line.

In an error correction based on the majority voting scheme, a majority vote is taken on bit data located in the identical bit positions with respect to the above-mentioned three switching allowance portions D13 in which the same data has been set in the transmitting side. Then, the bit data that gains the majority is adopted as bit data in those bit position. Thereby, an error correction is performed. Accordingly, in a case where no data corruption is occurring (see FIG. 7), naturally, the switching allowance portion D13 obtained after the error correction includes the data (bit sequence) that has been set in the transmitting side. On the other hand, even in a case where data corruption occurs (see FIG. 8), as a result of the error correction, the data that has been set in the transmitting side can be restored as the data of the switching allowance portion D13. An error correction process may be performed by the MAC 231 or by the data processing section 232.

The data (bit sequence) of the switching allowance portion D13 shown in FIGS. 6 to 8 is illustrative only. For example, a copy of data of a first switching allowance portion D13 from the header side is inserted into second and third switching allowance portions D13. In the example shown in FIG. 6, the same data is set in the three successive switching allowance portions D13. However, the switching allowance portions D13 in which the same data is set may not be successive, and the number of them is not limited to three. It may be also acceptable that the plurality of switching allowance portions D13 of the communication data D10 are divided into a plurality of groups and the data that is set in the switching allowance portion D13 is changed depending on the groups (in the example shown in FIG. 6, a fourth switching allowance portion D13 belongs to a group different from a group of the first to third switching allowance portions D13).

In general, the same data (in other words, the same bit sequence) is set in a plurality of switching allowance portions D13. The communication protocol that defines this data structure is shared by the communication apparatuses 100 and 200, and thereby the error correction can be performed in the second communication apparatus 200. As a result, even if data corruption occurs in the switching allowance portion D13 due to the switching operation of the SWR 241, the deterioration in the communication quality can be prevented.

Here, it may be also possible to perform the error correction in the same manner as described above by setting different data (bit sequences) in the plurality of switching allowance portions D13. For example, a protocol defining that the bit sequence that is set in one switching allowance portions D13 among a plurality of switching allowance portions D13 selected in advance should be preliminarily processed in accordance with a processing method adopted in advance, and then the processed bit sequence should be set in the remaining portions D13 of the plurality of switching allowance portions D13 is adopted.

Figure 9:
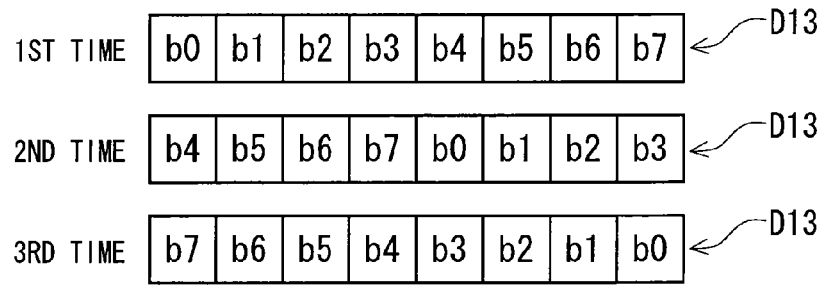
FIG. 9 A diagram showing an outline of a structure of communication data according to the first embodiment.

As one example of the above-mentioned data processing, a replacement of bit positions may be mentioned. In an example shown in FIG. 9, in a case where the bit values in the first switching allowance portion D13 are b0 to b7 (each value of b0 to b7 is "0" or "1") from the header side, a bit sequence b4, b5, b6, b7, b0, b1, b2, and b3 obtained by shifting the bit sequence b0, b1, b2, b3, b4, b5, b6, and b7 is set in the second switching allowance portion D13, and a bit sequence b7, b6, b5, b4, b3, b2, b1, and b0 obtained by reversing the arrangement of bits is set in the third switching allowance portion D13. The amount of shifting is not limited to the one shown in the example of FIG. 9. For example, the shifting and the reversing of bits may be combined.

A content of such data processing is included in the communication protocol shared by the communication apparatuses 100 and 200, to thereby enable the first communication apparatus 100 to process the data (bit sequence) to be set in the switching allowance portion D13 and enable the second communication apparatus 200 to reverse-process the data set in the switching allowance portion D13. The reverse-processed data is subjected to the error correction in the second communication apparatus 200.

That is, the second communication apparatus 200 reverse-processes the data set in the above-mentioned remaining switching allowance portions D13 of the received communication data D10 in accordance with the above-mentioned predetermined processing method, and performs the error correction by using data obtained as a result of the reverse-processing and the data set in the above-mentioned one switching allowance portion D13 of the received communication data D10.

The data processing in the first communication apparatus 100 may be performed by either of the data processing section 111 and the MAC 112. The data reverse-processing in the second communication apparatus 200 may be performed by either of the MAC 231 and the data processing section 232.

Adoption of such data processing provides the following effects. That is, in a case where the switching operation of the SWR 241 occurs at the same timing every time, there is a possibility that data corruption will occur in the identical bit positions in the respective switching allowance portions D13. Accordingly, in a case where the same data is set in the plurality of switching allowance portions D13, the error correction may have an inappropriate result. However, the aforementioned failure can be avoided by, as described above, setting the different data generated and originating from the single data in the plurality of switching allowance portions D13. Thus, a resistance to noise involved in the operation of the SWR 241 is improved, and the deterioration in the communication quality can be more surely prevented.

In the description given above, a case where the error correction is performed by using the plurality of switching allowance portions D13 is illustrated. However, a method that allows the error correction to be performed by using a single switching allowance portion D13 may be adopted.

Figure 10:
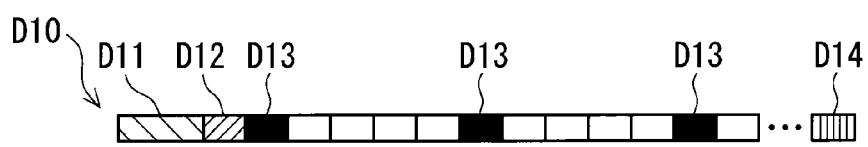
FIG. 10 A diagram showing an outline of a structure of communication data according to the first embodiment.

As illustrated in FIG. 10, a protocol may be adopted in which data D14 for error detection, such as CRC, is added to the communication data D10. In the second communication apparatus 200, while the data D14 for error detection is being obtained, the SWR 241 does not operate. Therefore, the data D14 is not influenced by noise, and a high reliability is obtained. Consequently, this, in conjunction with the above-described error correction, contributes to ensuring of the communication quality.

Second Embodiment

Figure 11:
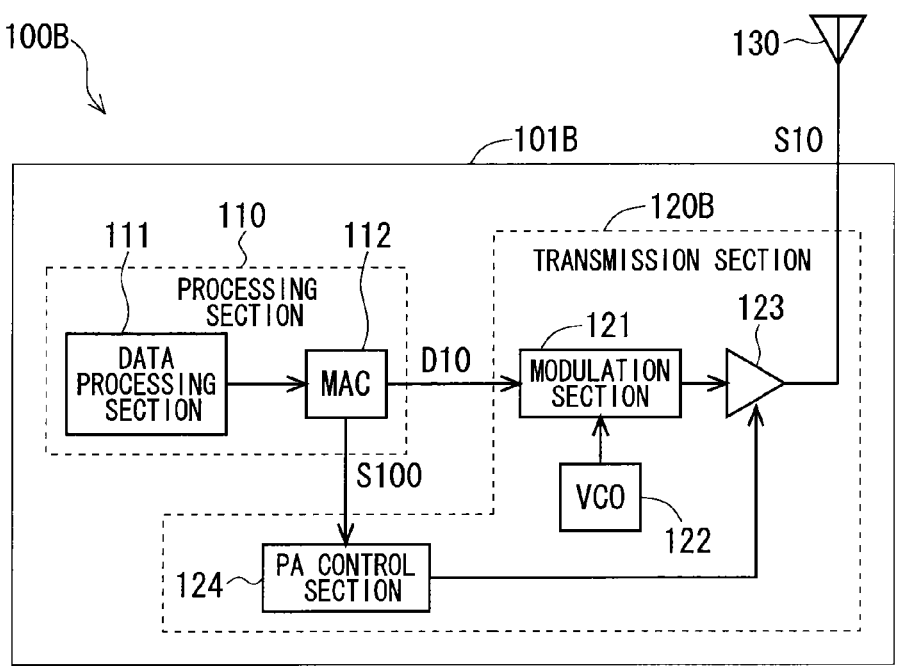
FIG. 11 A block diagram showing an outline of a configuration of a first communication apparatus according to a second embodiment.

FIG. 11 illustrates a block diagram showing an outline of a configuration of a first communication apparatus 100B according to a second embodiment. The first communication apparatus 100B illustrated in FIG. 11 has the same configuration as that of the first communication apparatus 100 (see FIG. 2) according to the first embodiment, except that the transmission section 120 is replaced with the transmission section 120B. The transmission section 120B has the same configuration as that of the transmission section 120 (see FIG. 2), except that a PA control section 124 is additionally provided. In an example shown in FIG. 11, the PA control section 124 is added to the communication integrated circuit 101 (see FIG. 2), and thus a communication integrated circuit 101B is formed. The other parts of the configuration of the first communication apparatus 100B are basically the same as those of the first communication apparatus 100.

The PA control section 124 is configured to control output power of a PA 123 in accordance with a control signal S100 outputted from the MAC 112 of the processing section 110.

FIG. 12 is a timing chart showing an outline of an operation of the first communication apparatus 100B. In FIG. 12, the timing chart (see FIG. 5) of the second communication apparatus 200 according to the first embodiment is also shown. Although operation timings of the communication apparatuses 100B and 200 may be misaligned in accordance with a time required for transmission of the communication data D10, such misalignment in the timing is not shown for simplification of the drawing.

Firstly, in the first communication apparatus 100B, the generation and output of the transmission signal S10 by the transmission section 120B is executed in real time, that is, promptly and continuously, upon obtaining of the communication data D10 from the processing section 110. Therefore, the output of the communication data D10 from the processing section 230 and the output of the transmission signal S10 from the transmission section 120B are substantially simultaneously executed.

Particularly, in outputting the communication data D10, the MAC 112 outputs, to the PA control section 124, the control signal S100 indicating that the switching allowance portion D13 is currently outputted (see FIG. 12). In accordance with the control signal S100, the PA control section 124 increases the output of the PA 123, in other words, the transmission power of the transmission signal S10, only while the switching allowance portion D13 is being outputted (see FIG. 12). That is, the processing section 110 controls the transmission section 120B such that the switching allowance portion D13 is transmitted with greater power than other portions of the communication data D10.

In a case illustrated in FIG. 12, the control signal S100 is in High state throughout the time period in which the switching allowance portion D13 is outputted, and is in Low state in the other time periods. However, the waveform of the signal S100 is not limited to the one shown in this example. In another possible waveform, for example, the High state and the Low state may be reversed. The time period in which the switching allowance portion D13 is outputted can be set in advance based on various known parameters, such as the speed of generation of the communication data D10. Therefore, in a possible mode, for example, only a timing at which the outputting of the switching allowance portion D13 is started may be notified.

On the other hand, in the second communication apparatus 200, similarly to the first embodiment, the SWR 241 is operated in the time period MA1a in which the switching allowance portion D13 is received (see FIG. 12).

Noise may be caused by the switching operation of the SWR 241, but the transmission power of the switching allowance portion D13 is increased as described above, and thereby the noise resistance of the switching allowance portion D13 is enhanced. That is, a signal level of the switching allowance portion D13 is set to such a level that data can be identified even if noise is superimposed thereon. Thus, an influence of the noise can be made negligible. Thus, the deterioration in the communication quality can be prevented.

In this manner, increasing the transmission power can be taken as the measures against noise in the first communication apparatus 100B side, because of the adoption of the switching allowance portion D13 that is associated with the time period in which the SWR 241 is operated. In other words, it is because of adoption of such a protocol that the portion D13 of the communication data D10 presupposed to be possibly influenced by noise can be identified in the transmitting side.

Here, it is possible that the second communication apparatus 200 is combined with the first communication apparatus 100B without any change, to form the communication system 10 (see FIG. 1). However, the need to set the dummy data in the switching allowance portion D13 is reduced. This is because the reliability of the data of the switching allowance portion D13 is increased due to the improvement in the noise resistance.

For the same reason, a mode that does not perform the error correction can be adopted. In this case, it is not necessary that the switching allowance portion D13 has a redundancy required for the error correction, and therefore more information can be incorporated in one communication data D10.

Third Embodiment

In the examples described in the first and second embodiments, the SWR 241 is operated only in the period of the communication state MA1 (see FIGS. 4, 5, and 12).

Instead, the SWR 241 may be operated further in a period of the non-communication state MC, as illustrated in a timing chart of FIG. 13. For example, the operation of the SWR 241 in the period of the non-communication state MC can be performed in accordance with a timer (not shown) that is provided inside or the outside the power supply management section 243.

In a case illustrated in FIG. 13, the SWR 241 is operated throughout the period of the non-communication state MC. However, in another possible configuration, the SWR 241 may be operated only in a part of the period of the non-communication state MC, such as only in the data processing state MA2 or in the stopped state MB.

In this manner, the SWR 241 is operated not only in the period of the communication state MA1 but also the period of the non-communication state MC. This can reduce a temporal bias in power generation, as compared with a case where the SWR 241 is operated only in the period of the communication state MA1. Therefore, the power supply can be stabilized.

Fourth Embodiment

Figure 14:
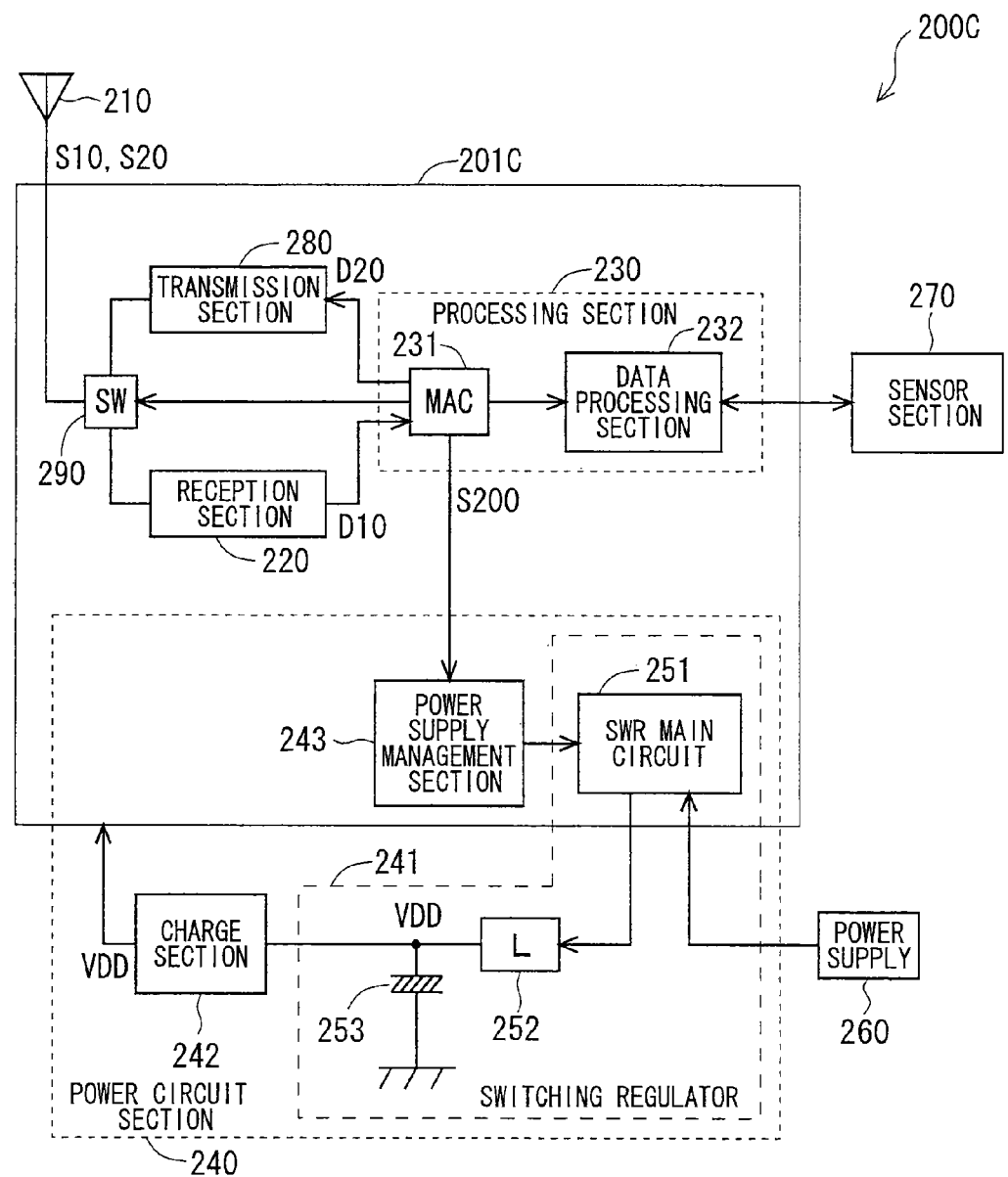
FIG. 14 A block diagram showing an outline of a configuration of a second communication apparatus according to a fourth embodiment.
Figure 15:
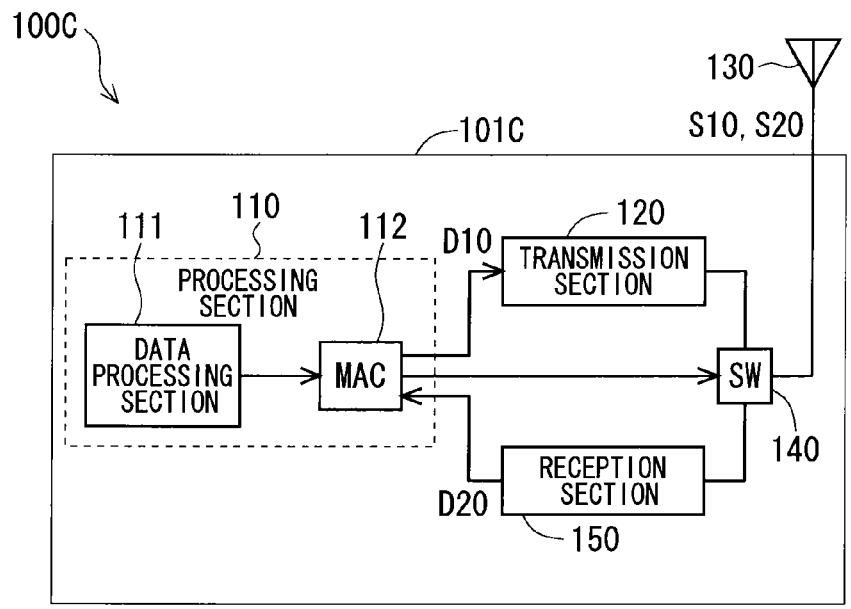
FIG. 15 A block diagram showing an outline of a configuration of a first communication apparatus according to the fourth embodiment.

In a fourth embodiment, a description will be given to an example in which the above-described communication system 10 is applied to a sensor system. However, applications of the communication system 10 are not limited to the sensor system. FIGS. 14 and 15 illustrate block diagrams showing outlines of a second communication apparatus 200C and a first communication apparatus 100C that are applied to a sensor system.

<Second Communication Apparatus 200C>

The second communication apparatus 200C illustrated in FIG. 14 has the same configuration as that of the second communication apparatus 200 (see FIG. 3) according to the first embodiment, except that a sensor section 270, a transmission section 280, and a transmission-reception switching section (in the drawing, denoted by "SW") 290 are additionally provided. In an example shown in FIG. 14, the transmission section 280 and the transmission-reception switching section 290 are added the communication integrated circuit 201 (see FIG. 3), and thus a communication integrated circuit 201C is formed. The other parts of the configuration of the second communication apparatus 200C are basically the same as those of the second communication apparatus 200.

The sensor section 270 is configured to include various sensors such as a mechanical sensor, an electrical sensor, or an optical sensor and, as appropriate, includes a sensor drive circuit, too. In the example shown in FIG. 14, the sensor section 270 is connected to the data processing section 232 and controlled by the data processing section 232, and outputs a detection result to the data processing section 232.

The transmission section 280 is configured to obtain communication data D20 generated by the processing section 230, and to generate and output a transmission signal S20 for wirelessly transmitting the communication data D20. The communication data D20 is, for example, data concerning a detection result of the sensor section 270. The transmission section 280 is configurable to adopt, for example, a known transmission circuit or the above-described transmission section 120 or 120B (see FIGS. 2 and 11).

The transmission-reception switching section 290 is configured to selectively connect either one of the reception section 220 and the transmission section 280 to the antenna 210. In the example shown in FIG. 14, switching between the reception section 220 and the transmission section 280 by the transmission-reception switching section 290 is controlled by the MAC 231.

<First Communication Apparatus 100C>

The first communication apparatus 100C illustrated in FIG. 15 has the same configuration as that of the first communication apparatus 100 (see FIG. 2) according to the first embodiment, except that a transmission-reception switching section 140 and a reception section 150 are additionally provided. In an example shown in FIG. 15, the transmission-reception switching section 140 and the reception section 150 are added to the communication integrated circuit 101 (see FIG. 2), and thus a communication integrated circuit 101C is formed. The other parts of the configuration of the first communication apparatus 100C are basically the same as those of the first communication apparatus 100.

It may be also possible that the first communication apparatus 100C is formed by adding the transmission-reception switching section 140 and the reception section 150 to the first communication apparatus 100B (see FIG. 11) according to the second embodiment.

The transmission-reception switching section 140 is configured to selectively connect either one of the transmission section 120 and the reception section 150 to the antenna 130. In the example shown in FIG. 15, switching between the transmission section 120 and the reception section 150 by the transmission-reception switching section 140 is controlled by the MAC 112.

The reception section 150 is configured to receive the transmission signal S20 via the antenna 130, restore the communication data D20 from the received transmission signal S20, and output the restored communication data D20 to the MAC 112. The reception section 150 is configurable to adopt, for example, a known receive circuit or the above-described reception section 220 (see FIG. 3).

<Sensor System>

For example, the communication apparatuses 100C and 200C can operate such that the first communication apparatus 100C transmits an operation instruction of the sensor section 270, and the second communication apparatus 200C receives the instruction and transmits a detection result of the sensor section 270 back to the first communication apparatus 100C. In view of such a form of usage, the first communication apparatus 100C may be called a host apparatus 100C and the second communication apparatus 200C may be called a sensor apparatus 200C.

The communication system 10 applied to this sensor system also exhibits the above-described various effects.

Fifth Embodiment

In the above-described examples of the first to fourth embodiments, the switching operation of the SWR 241 of the second communication apparatus 200, 200C is performed in synchronization with reception of the switching allowance portion D13 of the communication data D10. In other words, the timing of the switching operation of the SWR 241 is instructed by the received data.

In a fifth embodiment, on the other hand, a description will be given to an example that allows the switching operation of the SWR 241 to be performed without an instruction by the received data.

Figure 16:
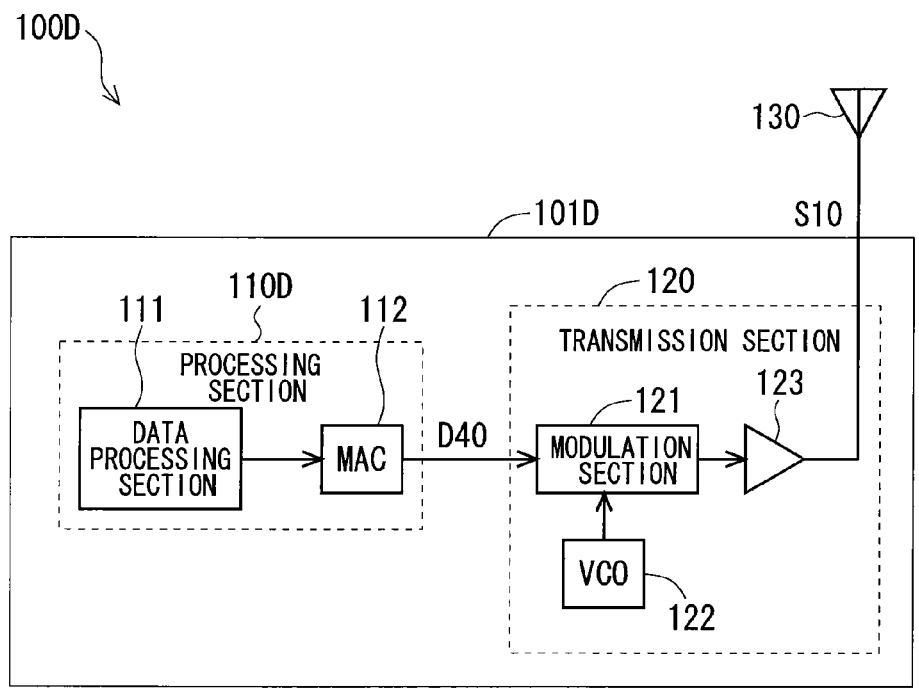
FIG. 16 A block diagram showing an outline of a configuration of a first communication apparatus according to a fifth embodiment.

FIGS. 16 and 17 illustrate block diagrams showing outlines of configurations of a first communication apparatus 100D and a second communication apparatus 200D according to the fifth embodiment. The communication system 10 (see FIG. 1) is configured by a combination of the communication apparatuses 100D, 200D.

<First Communication Apparatus 100D>

The first communication apparatus 100D illustrated in FIG. 16 has the same configuration as that of the first communication apparatus 100 (see FIG. 2) according to the first embodiment, except that the processing section 110 is replaced with a processing section 110D. The other parts of the configuration of the first communication apparatus 100D are basically the same as those of the first communication apparatus 100. In an example shown in FIG. 16, similarly to the communication integrated circuit 101 (see FIG. 2), all the elements of the processing section 110D and all the elements of the transmission section 120 are provided in a communication integrated circuit 101D.

The processing section 110D is configured to perform various processes, such as calculations and controls, in the first communication apparatus 100D. In the example shown in FIG. 16, similarly to the processing section 110 (see FIG. 2), the processing section 110D includes the data processing section 111 and the MAC 112.

However, the above-mentioned various processes performed by the processing section 110D include a process of generating communication data D40 from communication data D30 (see FIG. 18 which will be described later; hereinafter also referred to as "original data D30") in accordance with a predetermined protocol. The communication data D40 is similar to the communication data D10 (see FIG. 2) of the first embodiment, in terms of being delivered to the transmission section 120, but its data structure is different from that of the communication data D10, which will be clearly described later. Therefore, the protocol that is used by one or both of the data processing section 111 and the MAC 112 for generating the communication data has a content different from that of the first embodiment.

Here, it is assumed that the processing section 110D operates similarly to the processing section 110 except the generation of the communication data D40.

<Second Communication Apparatus 200D>

The second communication apparatus 200D illustrated in FIG. 17 has the same configuration as that of the second communication apparatus 200 (see FIG. 3) according to the first embodiment, except that the processing section 230 is replaced with a processing section 230D. The other parts of the configuration of the second communication apparatus 200D are basically the same as those of the second communication apparatus 200. In an example shown in FIG. 17, similarly to the communication integrated circuit 201 (see FIG. 3), all the elements of the reception section 220, all the elements of the processing section 230D, and part of the elements of the power circuit section 240 are provided in a communication integrated circuit 201D.

The processing section 230D is configured to perform various processes, such as calculations and controls, in the second communication apparatus 200D. In the example shown in FIG. 17, similarly to the processing section 230 (see FIG. 3), the processing section 230D includes the MAC 231 and the data processing section 232.

However, the above-mentioned various processes performed by the processing section 230D include a process of processing the communication data D40 transmitted in the transmission signal S10 from the first communication apparatus 100D and restored by the reception section 220 in accordance with a predetermined protocol and thereby restoring the original data D30 (see FIG. 18 which will be described later) of the communication data D40. Therefore, a different point from the first embodiment is that a protocol concerning the generation of the original data is used by one or both of the MAC 231 and the data processing section 232. Regarding a process of obtaining the original data D30, the processing section 230D (in the example shown in FIG. 17, the MAC 231) obtains, from the power supply management section 243, a signal for controlling the switching operation of the SWR 241 (described later).

Here, it is assumed that the processing section 230D operates similarly to the processing section 230 except the restoration of the original data D30.

First Example of Operation of Communication Apparatus 100D, 200D

Operations of the communication apparatuses 100D and 200D will be illustrated with reference to schematic diagrams of FIGS. 18 and 19 in addition to FIGS. 16 and 17 described above. FIG. 19 is an enlarged view corresponding to FIG. 18, but shows the operation timing of the SWR 241 being shifted from that of FIG. 18 for convenience of the following description.

The processing section 110D of the first communication apparatus 100D divides a bit sequence that forms the transmission-object original data D30 into a plurality of blocks, and generates a new bit sequence in which each of these divided blocks successively appears at least twice. This new bit sequence is incorporated into the payload of the communication data D40.

Figure 18:
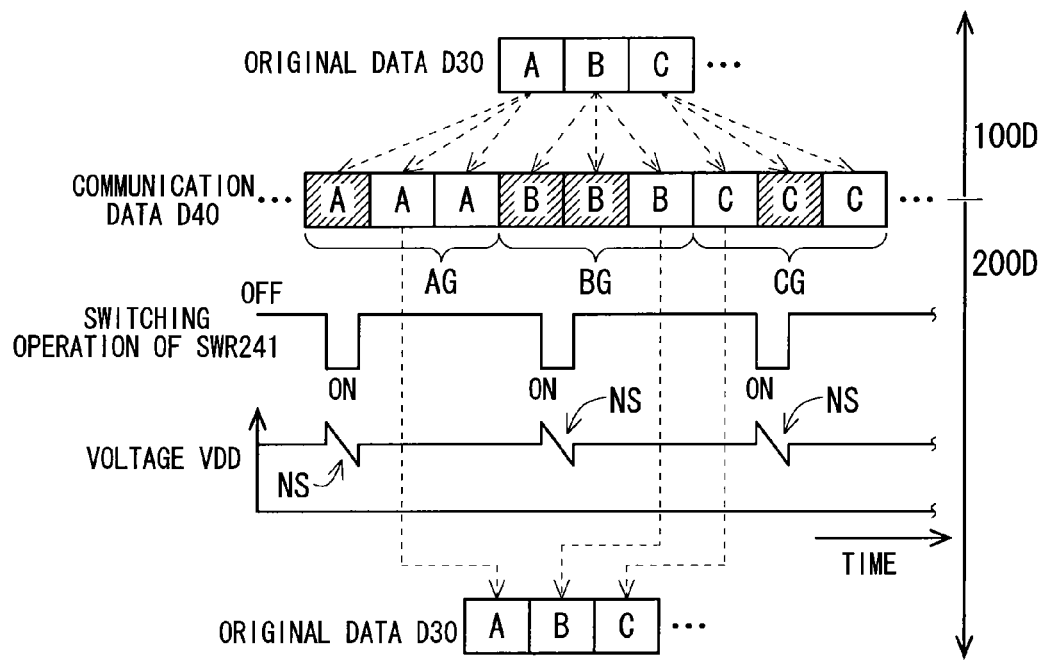
FIG. 18 A schematic diagram showing an outline of a first exemplary operation of the first communication apparatus and the second communication apparatus according to the fifth embodiment.
Figure 19:
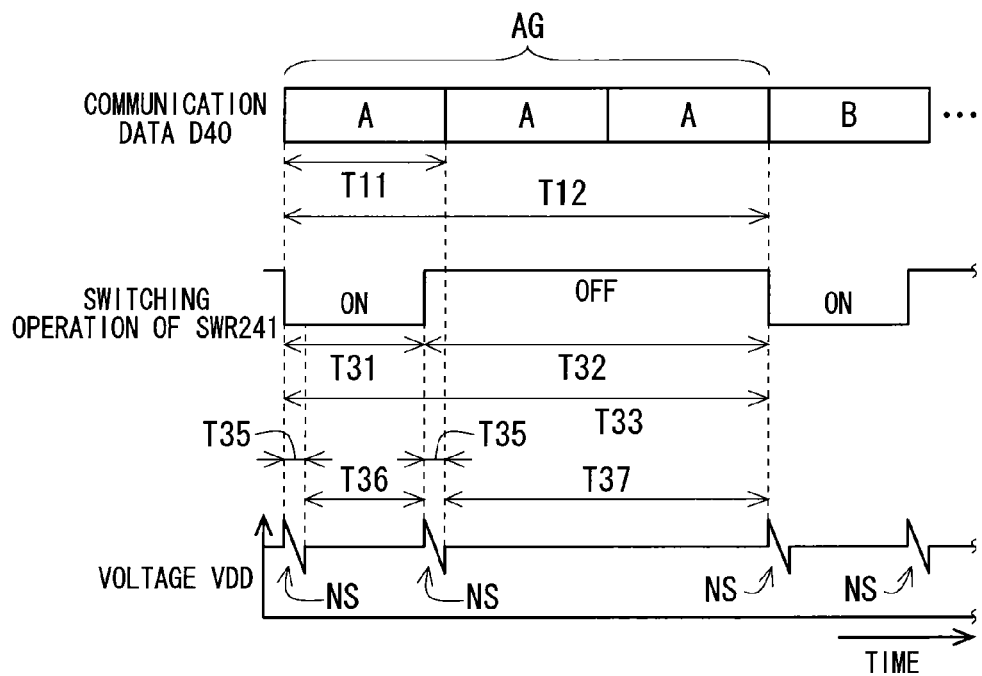
FIG. 19 An enlarged view corresponding to FIG. 18.

In an example shown in FIG. 18, because of the scale of the drawing, blocks A, B, and C are illustrated as the plurality of blocks described above. In the bit sequence of the original data D30, the divided blocks A, B, and C are successively arranged in this order.

In the communication data D40, the blocks A, B, and C are arranged such that the same type successively appears. To be specific, the block A successively appears three times, then the block B successively appears three times, and then block C successively appears three times. However, the number of times each of the blocks A, B, and C is repeated is not limited to this example.

In the following, a portion where the same type of block is repeated (in other words, a succession of the same type of blocks) will be sometimes referred to as a block group. For example, a portion where the block A is repeated will be also referred to as a block group AG.

Conversion from the original data D30 into the communication data D40 may be performed by either of the data processing section 111 and the MAC 112.

The communication data D40 generated by the processing section 110D is transmitted, as the transmission signal S10, from the first communication apparatus 100D via the transmission section 120 and the antenna 130.

The transmission signal S10 is received by the second communication apparatus 200D via the antenna 210, and then restored into the communication data D40 by the reception section 220. The restored communication data D40 is delivered to the processing section 230D.

Here, similarly to the communication apparatus 200 of the first embodiment, the second communication apparatus 200D alternately adopts the running state MA and the stopped state MB (see FIG. 4). Switching between the communication state MA1 and the data processing state MA2 is performed in the period of the running state MA (see FIG. 4). As already described, the data processing state MA2 and the stopped state MB may be collectively referred to as the non-communication state MC (see FIG. 4).

In the second communication apparatus 200D, similarly to the communication apparatus 200 of the first embodiment, the SWR 241 is operated during the running state MA. Accordingly, during the state MA in which the communication data D40 is received, the switching operation of the SWR 241 is performed.

In an example of a waveform shown in FIG. 18, ON state of the SWR 241 (and more specifically, the switching section of the SWR 241) corresponds to Low state, and OFF state of the SWR 241 corresponds to High state.

As already described, when the switching operation of the SWR 241 is made, the noise NS may occur in the output voltage VDD of the power circuit section 240 (see FIG. 18). Moreover, in some cases, a noise other than the power supply noise NS may be caused by the switching operation of the SWR 241. Such various noises may cause a data error in the communication data D40 received by the second communication apparatus 200D.

In view of this point, the second communication apparatus 200D avoids (for example, receives but discards) a portion of the received communication data D40 that is received during a time period T35 (see FIG. 19, hereinafter also referred to as "noise influence period T35") in which an influence of noise caused by the switching operation of the SWR 241 may occur, on a unit basis of each block A, B, C. Then, the second communication apparatus 200D extracts the blocks A, B, and C from the remaining portions of the communication data D40. Then, the second communication apparatus 200D sequentially combines the extracted blocks A, B, and C, thereby restoring the bit sequence of the original data D30.

In the example shown in FIG. 18, the blocks A, B, and C that are not used for the restoration of the original data D30 are hatched. More specifically, as for the block group AG, the switching operation is performed during the reception of the beginning block A (that is received at the earliest time). Therefore, this beginning block A is avoided, and the second block A is used for the restoration of the original data D30. As for the block group BG, the switching operation is performed through the reception of the beginning and second blocks B. Therefore, the third block B is used. As for the block group CG, the switching operation is performed after reception of the beginning block C. Therefore, the beginning block C may be used.

The restoration of the original data D30 from the received communication data D40 may be performed by either of the MAC 231 and the data processing section 232. In the example shown in FIG. 17, the MAC 231 obtains the signal for controlling the switching operation of the SWR 241 from the power supply management section 243, and selects the blocks A, B, and C to be used or not used for the restoration of the original data D30 based on the control signal.

For example, it may be also possible that the MAC 231 or the data processing section 232 obtains the control signal in the stage of being supplied to the switching section of the SWR main circuit 251, and restores the original data D30 based on this control signal.

The noise influence period T35 is a time period that is determined in accordance with the switching operation of the SWR 241 (more specifically, a state shifting of the switching section of the SWR 241). To be specific, as shown in FIG. 19, the noise influence period T35 occurs in each of the state shifting from OFF to ON and the state shifting from ON to OFF. The noise influence period T35 starts when the aforesaid state shifting starts, and continues even after the state shifting ends because in general a time is required for conversing noise. That is, the length of the noise influence period T35 is set to be a time period required for converging the noise, in other words, to be a time width of the noise.

In an example shown in FIG. 19, a time width of the power supply noise NS is defined as the noise influence period T35. Instead, the noise influence period T35 may be defined based on another noise or the probability of occurrence of the above-mentioned data error. For example, a recognition that noise has converged may be based on the fact that the magnitude of the noise or the probability of occurrence of the above-mentioned data error drops to or below a predetermined value. The length of the noise influence period T35 can be set through, for example, a simulation, an experiment, or the like.

Although FIG. 19 shows the power supply noise NS for each of the above-mentioned state shiftings, the illustrations in FIG. 18 and the like are simplified for avoiding complication of the drawings.

The example shown in FIG. 19 will be further described. In the illustration of comparisons in FIG. 19, for easy understanding, the timing when the SWR 241 shifts from OFF to ON is aligned with the beginning of the block group AG. In FIG. 19, the hatching of the blocks A, B, and C is omitted.

In FIG. 19, the reference numeral T11 is given to a reception period in which the second communication apparatus 200D receives the block A. Regarding the following expression (1a) and the like, the same reference numeral T11 is given to a time length of this time period T11. This way of using the reference numeral applies to the other time periods, too. The lengths of reception periods for receiving the blocks B and C are also denoted by T11.

In the example shown in FIG. 19, the block group AG includes three blocks A, and therefore, the following expression is satisfied.

$$\{\text{Reception Period } T12 \text{ of Block Group } AG\} = T11 \times 3 \quad (1a)$$

Here, the length of the reception period T11 corresponds to a time period required for receiving each of the blocks A, B, and C. In other words, a bit length of each of the blocks A, B, and C corresponds to the number of bits receivable within the reception period T11. Accordingly, in FIG. 19, it can be recognized that the length of the reception period T11 indicates the bit length of each of the blocks A, B, and C. The number of bits that can be received by the second communication apparatus 200D within the reception period T11 depends on the communication speed between the communication apparatuses 100D and 200D (in other words, transmission performance of the first communication apparatus 100D and reception performance of the second communication apparatus 200D).

In FIG. 19, an ON-time period T31 of the SWR 241 is a time period during which the SWR 241 is kept in the ON state, and in other words, is a time period from when the SWR 241 shifts from OFF to ON to when the SWR 241 returns to OFF again. An OFF-time period T32 of the SWR 241 is a time period during which the SWR 241 is kept in the OFF state, and in other words, is a time period from when the SWR 241 shifts from ON to OFF to when the SWR 241 returns to ON again.

The ON-time period T31 and the OFF-time period T32 are alternate, and both time periods T31 and T32 are continuous. A continuous period of one ON-time period T31 and one OFF-time period T32 is equivalent to one cycle T33 of the switching operation. At this time, the following expression is satisfied.

$$T31 + T32 = T33 \quad (1b)$$

In the switching cycle T33, either one of the time periods T31 and T32 may precede the other.

The OFF-time period T32 can be regarded as an interval time between two adjacent ON-time periods T31. Likewise, the ON-time period T31 can be regarded as an interval time between two adjacent OFF-time periods T32.

A time period (hereinafter, also referred to as "noise avoidance period") in which an influence of noise can be avoided is provided between the two adjacent noise influence periods T35.

To be more specific, the noise avoidance period T36 is provided between the noise influence period T35 occurring at the time when the ON-time period T31 starts and the noise influence period T35 occurring at the time when the ON-time period T31 ends (in other words, at the time when the next OFF-time period T32 starts). This noise avoidance period T36 is equivalent to a portion of the ON-time period T31 excluding the noise influence period T35 at the time when the ON-time period T31 starts. Here, the following expression is satisfied.

$$T35 + T36 = T31 \quad (1c)$$

A noise avoidance period T37 is provided between the noise influence period T35 occurring at the time when the OFF-time period T32 starts and the noise influence period T35 occurring at the time when the OFF-time period T32 ends (in other words, at the time when the next ON-time period T31 starts). This noise avoidance period T37 is equivalent to a portion of the OFF-time period T32 excluding the noise influence period T35 occurring at the time when the OFF-time period T32 starts. Here, the following expression is satisfied.

$$T35 + T37 = T32 \quad (1d)$$

In FIG. 19, for example, the following relationships are shown.

$$T11 \times 3 = T12 \quad (1a)$$

$$T31 + T32 = T33 \quad (1b)$$

$$T35 + T36 = T31 \quad (1c)$$

$$T35 + T37 = T32 \quad (1d)$$

$$T33 = T12 \quad (1e)$$

$$T31 < T11 \quad (1f)$$

$$T31 + T35 = T11 \quad (1g)$$

$$T32 > T11 \times 2 \quad (1h)$$

$$T36 < T11 \quad (1i)$$

$$T37 = T11 \times 2 \quad (1j)$$

In a first exemplary operation, as described above, the second communication apparatus 200D operates the SWR 241 during the state MA in which the communication data D40 is received. In the received communication data D40, a portion received during the noise influence period T35 is not used for the restoration of the original data D30. The first communication apparatus 100D generates and transmits the communication data D40 having data structure suitable for such an operation of the second communication apparatus 200D. Therefore, even though the SWR 241 is operated during the reception of the communication data D40, the deterioration in the communication quality can be prevented.

Particularly, it is not necessary to synchronize the switching operation of the SWR 241 with a predetermined portion (see the switching allowance portion D13 according to the first embodiment) of the communication data D40. Therefore, the configuration of the apparatus can be simplified. Moreover, an error correction function as illustrated in the first embodiment is not necessary. In this respect as well, the configuration of the apparatus can be simplified.

According to the relationship represented by the expression (1j) mentioned above, in one cycle T33, the whole of the block A inevitably exists in the noise avoidance period T37. Therefore, the whole of the block A can be surely extracted from the block group AG. The same is true for the other blocks B and C.

Here, if the relationship of T37≥T11×2 is satisfied, in other words, if a succession of at least two blocks A can be received within the noise avoidance period T37, the above-described effects are obtained. Particularly, when the relationship represented by the expression (1j) mentioned above is satisfied, an effect that the number of times the block A is repeated can be suppressed is further obtained. The same is true for the other blocks B and C. As a result, the lengths of the block groups AG, BG, and CG are suppressed, and thus a data efficiency can be improved.

Also when the relationship of T36≥T11×2 is satisfied, the same effects are obtained.

Second Example of Operation of Communication Apparatus 100D, 200D

Figure 20:
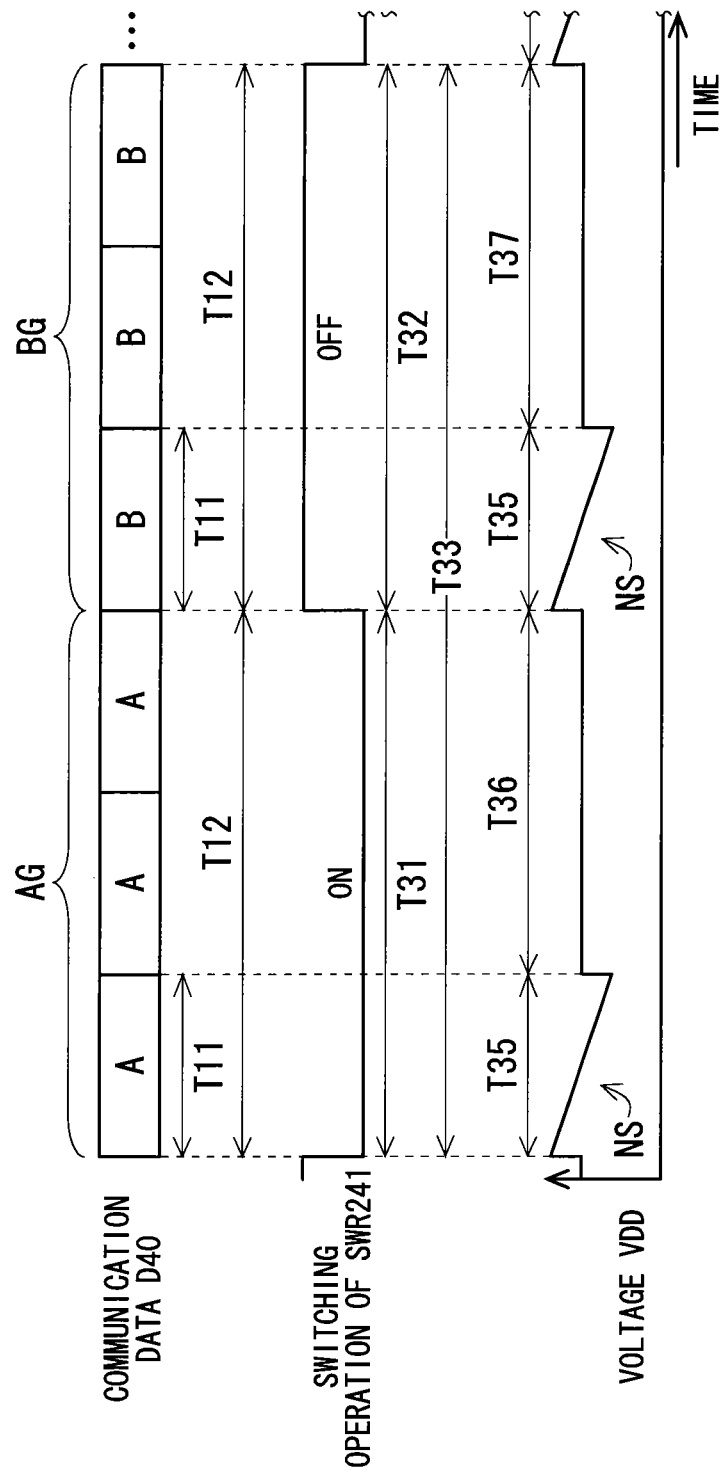
FIG. 20 A schematic diagram showing an outline of a second exemplary operation of the first communication apparatus and the second communication apparatus according to the fifth embodiment.

FIG. 20 is a schematic diagram showing an outline of a second exemplary operation of the communication apparatuses 100D and 200D. FIG. 20 is illustrated in a similar manner to FIG. 19 described above.

In FIG. 20, for example, the following relationships are shown.

$$T11 \times 3 = T12 \tag{2a}$$

$$T31 + T32 = T33 \tag{2b}$$

$$T35 + T36 = T31 \tag{2c}$$

$$T35 + T37 = T32 \tag{2d}$$

$$T31 = T32 = T12 \tag{2e}$$

$$T35 = T11 < T31, T32 \tag{2f}$$

$$T36 = T37 = T11 \times 2 \tag{2g}$$

Particularly, according to the relationship represented by the expression (2g), in one cycle T33, the whole of the block A inevitably exists in the noise avoidance period T36 and the whole of the block B inevitably exists in the noise avoidance period T37. Thus, the same effects as described above are obtained. Similarly to the first exemplary operation, the above-described effects are obtained when the relationship of T36,T37≥T11×2 is satisfied.

Similarly to the first exemplary operation, the second exemplary operation also exerts the effects of prevention of the deterioration in the communication quality and simplification of the configuration of the apparatus.

Third Example of Operation of Communication Apparatus 100D, 200D

In the description given above, a case where the portion received during the noise influence period T35 is avoided on a unit basis of each block A, B, C and thereby the blocks A, B, and C are extracted is illustrated. In this third example, on the other hand, a case where the portion received during the noise influence period T35 is avoided on a unit basis of a sub-block that is obtained by subdividing the blocks A, B, and C is illustrated.

Figure 21:
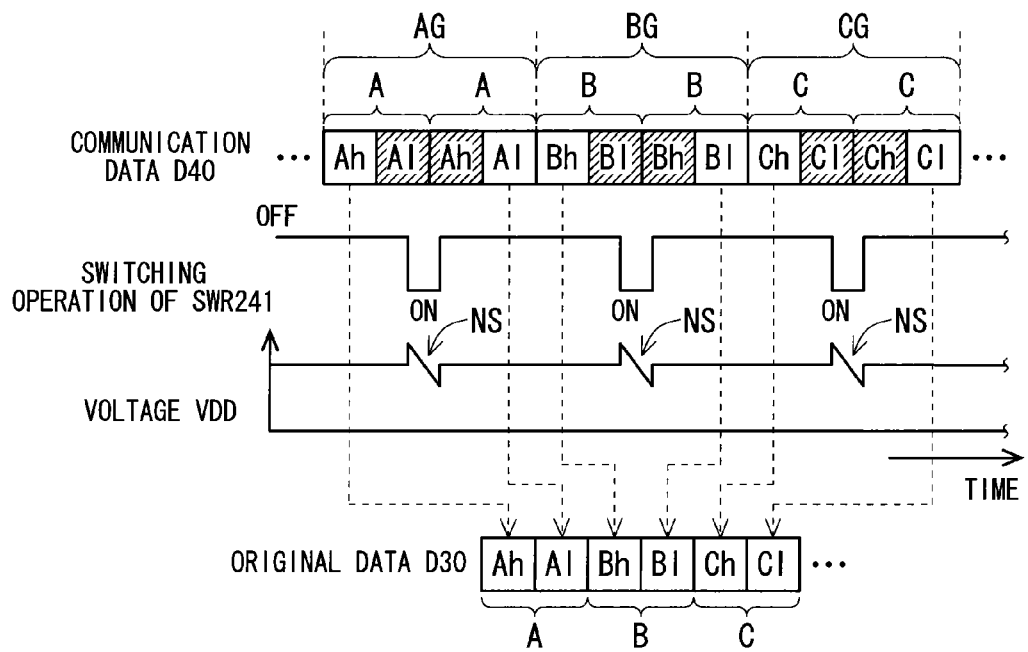
FIG. 21 A schematic diagram showing an outline of a third exemplary operation of the first communication apparatus and the second communication apparatus according to the fifth embodiment.
Figure 22:
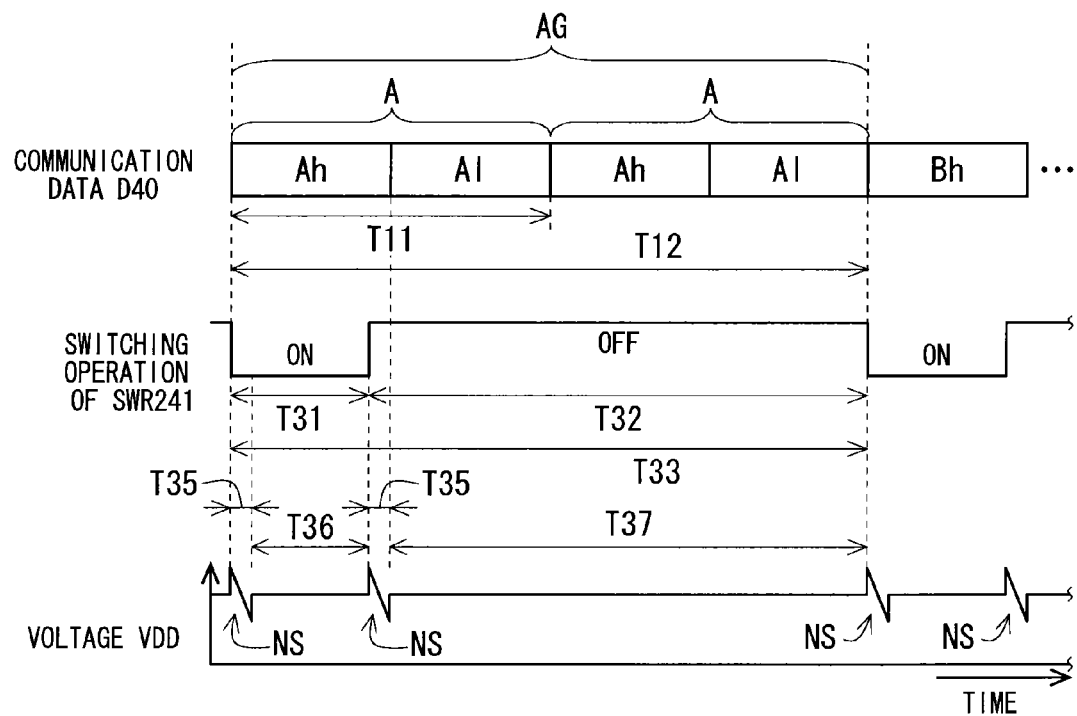
FIG. 22 An enlarged view corresponding to FIG. 21.

FIG. 21 is a schematic diagram showing an outline of a third exemplary operation of the communication apparatuses 100D and 200D, and FIG. 22 is an enlarged view corresponding to FIG. 21. FIG. 22 is illustrated in a similar manner to FIG. 19 described above.

In FIGS. 21 and 22, sub-blocks Ah, Al, Bh, Bl, Ch, and Cl obtained by equally dividing each of the blocks A, B, and C into two parts are illustrated as the aforesaid sub-blocks.

To be more specific, in an example shown in FIG. 21, the switching operation is performed across a reception period for receiving a latter-half sub-block Al of the beginning block A and a reception period for receiving a first-half sub-block Ah of the second block A. Therefore, these sub-blocks Al and Ah are avoided, and the block A is restored from the first-half sub-block Ah of the beginning block A and the latter-half sub-block Al of the second block A. The blocks B and C are restored in the same manner.

It suffices that a process on a unit basis of the sub-block is introduced in the second communication apparatus 200D that is the receiving side. The first communication apparatus 100D that is the transmitting side may generate the communication data D40 through a process on a unit basis of the block as described above.

In FIG. 22, for example, the following relationships are shown.

$$T11 \times 2 = T12 \tag{3a}$$

$$T31 + T32 = T33 \tag{3b}$$

$$T35 + T36 = T31 \tag{3c}$$

$$T35 + T37 = T32 \tag{3d}$$

$$T33 = T12 \tag{3e}$$

$$T31 < T11/2 \tag{3f}$$

$$T31 + T35 = T11/2 \tag{3g}$$

$$T32 > T11/2 \times 3 \tag{3h}$$

$$T36 < T11/2 \tag{3i}$$

$$T37 = T11/2 \times 3 \tag{3j}$$

Particularly, according to the relationship represented by the expression (3j), in one cycle T33, one pair of the sub-blocks Ah and Al inevitably exist in the noise avoidance period T37. Therefore, the whole of the block A can be surely extracted from the block group AG. The same is true for the other blocks B and C.

Here, if the relationship of T37≥T11/2×3 is satisfied, in other words, if a succession of at least three sub-blocks can be received within the noise avoidance period T37, the above-described effects are obtained. Particularly, when the relationship represented by the expression (3j) mentioned above is satisfied, an effect that the number of times the block A is repeated can be suppressed is further obtained. The same is true for the other blocks B and C. As a result, the lengths of the block groups AG, BG, and CG are suppressed, and thus a data efficiency can be improved.

As in this third exemplary operation, the portion received during the noise influence period T35 is selected on a unit basis of each sub-block Ah, Al, Bh, Bl, Ch, Cl, and thereby, even if the blocks A, B, and C partially overlap the noise influence period T35, the blocks A, B, and C can be restored by using the remaining portions. That is, the portion not used for the extraction of the blocks A, B, and C can be reduced as compared with the first and second exemplary operations. Accordingly, this third exemplary operation exerts an effect that only a smaller number of times the blocks A, B, and C need to be repeated as compared with the first and second exemplary operations. As a result, the lengths of the block groups AG, BG, and CG are suppressed, and thus a data efficiency can be improved.

In the description given above, a case where the sub-blocks Ah, Al, Bh, Bl, Ch, and Cl is obtained by equally dividing each of the blocks A, B, and C into two parts is illustrated. Instead, they may be subdivided into a greater number of sub-blocks. Moreover, unequal division may be adopted.

Similarly to the first exemplary operation, the third exemplary operation also exerts the effects of prevention of the deterioration in the communication quality and simplification of the configuration of the apparatus.

Also when the relationship of $T36 \geq T11/2 \times 3$ is satisfied, the same effects are obtained.

Fourth Example of Operation of Communication Apparatus 100D, 200D

Figure 23:
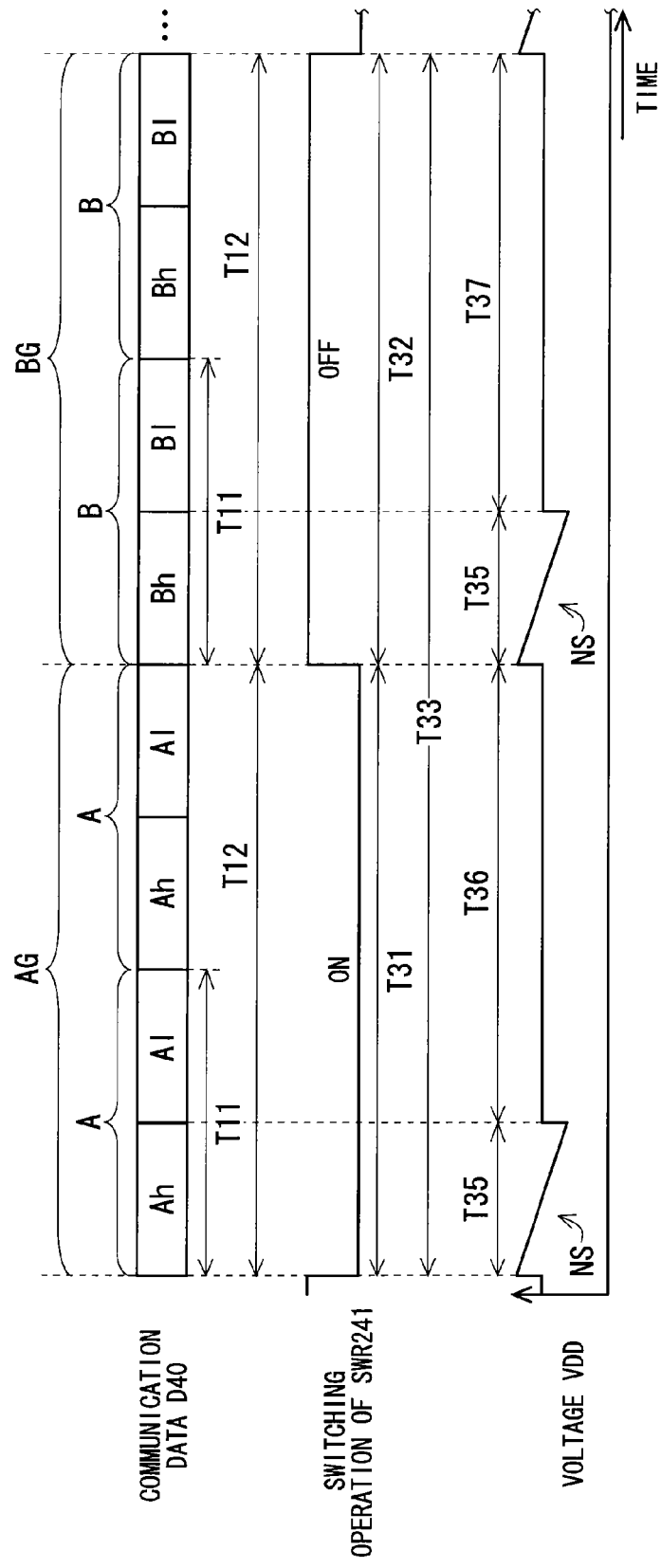
FIG. 23 A schematic diagram showing an outline of a fourth exemplary operation of the first communication apparatus and the second communication apparatus according to the fifth embodiment.

FIG. 23 is a schematic diagram showing an outline of a fourth exemplary operation of the communication apparatuses 100D and 200D. FIG. 23 is illustrated in a similar manner to FIG. 19 described above. In this fourth exemplary operation, similarly to the third exemplary operation described above, a block restoration process is performed on a unit basis of the sub-block.

In FIG. 23, for example, the following relationships are shown.

$$T11 \times 2 = T12 \quad (4a)$$

$$T31 + T32 = T33 \quad (4b)$$

$$T35 + T36 = T31 \quad (4c)$$

$$T35 + T37 = T32 \quad (4d)$$

$$T31 = T32 = T12 \quad (4e)$$

$$T35 = T11/2 < T31, T32 \quad (4f)$$

$$T36 = T37 = T11/2 \times 3 \quad (4g)$$

Particularly, according to the relationship represented by the expression (4g), in one cycle T33, one pair of the sub-blocks Ah and Al inevitably exist in the noise avoidance period T36, and likewise one pair of the sub-blocks Bh and Bl inevitably exist in the noise avoidance period T37. Therefore, the same effects as those of the third exemplary operation described above can be obtained. Similarly to the third exemplary operation, the above-described effects are obtained when the relationship of $T36, T37 \geq T11/2 \times 3$ is satisfied.

Similarly to the first exemplary operation, the fourth exemplary operation also exerts the effects of prevention of the deterioration in the communication quality and simplification of the configuration of the apparatus.

Modification of Fifth Embodiment

In the description given above, a case where the SWR 241 is operated only in the period of the communication state MA1 is illustrated. Instead, similarly to the third embodiment, the SWR 241 may be further operated in a partial period or the entire period of the non-communication state MC.

The above-described communication apparatuses 100D and 200D are applicable to the sensor system described in the fourth embodiment.

Sixth Embodiment

Figure 24:
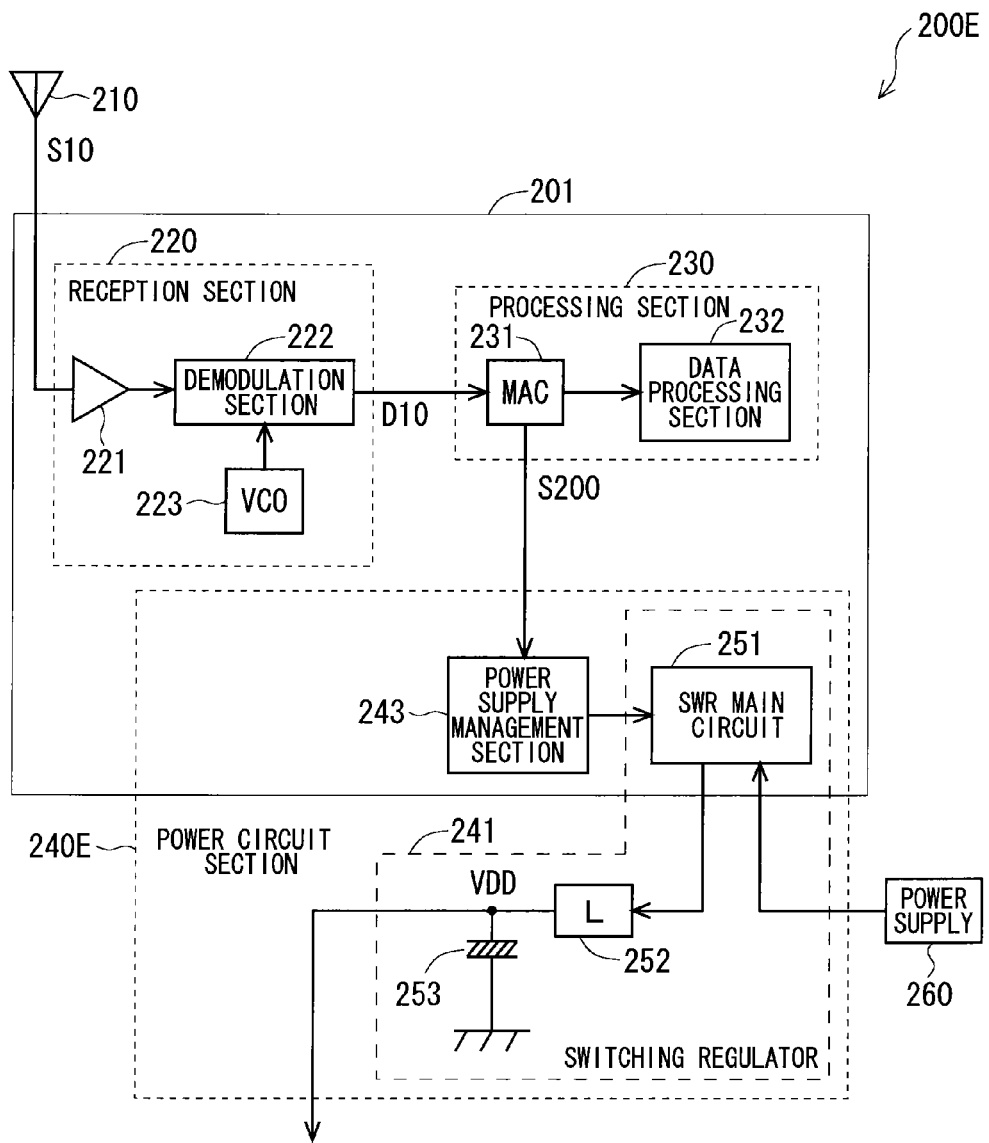
FIG. 24 A block diagram showing an outline of a first exemplary configuration of a second communication apparatus (power unit with communication function) according to a sixth embodiment.

FIG. 24 illustrates a block diagram showing an outline of a configuration of a second communication apparatus 200E according to a sixth embodiment. The second communication apparatus 200E illustrated in FIG. 24 has the same configuration as that of the second communication apparatus 200 (see FIG. 3) according to the first embodiment, except that the power circuit section 240 is replaced with a power circuit section 240E. The power circuit section 240E has the same configuration as that of the power circuit section 240 (see FIG. 3), except that the charge section 242 is removed. The power circuit section 240E is configured such that an output of the SWR 241 can be taken out of the communication apparatus 200E. The other parts of the configuration of the second communication apparatus 200E are basically the same as those of the second communication apparatus 200. The second communication apparatus 200E is combined with the first communication apparatus 100 (see FIG. 2) and the like, to from the communication system 10 (see FIG. 1).

In the second communication apparatus 200 already described, the output of the SWR 241 is supplied to a predetermined element (in the example of FIG. 3, the integrated circuit 201) inside the apparatus 200. In the second communication apparatus 200E, on the other hand, power can be supplied to the outside of the apparatus 200E. In other words, the second communication apparatus 200E can provide a power unit with communication function that is a power unit such as an AC/DC converter or a DC/DC converter being equipped with a communication function. The power unit 200E with communication function and an apparatus to which the power is supplied may be accommodated in the same housing or may be accommodated in separate housings.

It may be also possible that the charge section 242 (see FIG. 3) is left so that an output of the charge section 242 is taken out of the communication apparatus.

Depending on the magnitude of the supply voltage, a switching section that is provided outside may be used instead of the switching section provided within the SWR main circuit 251, and in other words, within the integrated circuit 201. Such a configuration is illustrated in FIG. 25.

Figure 25:
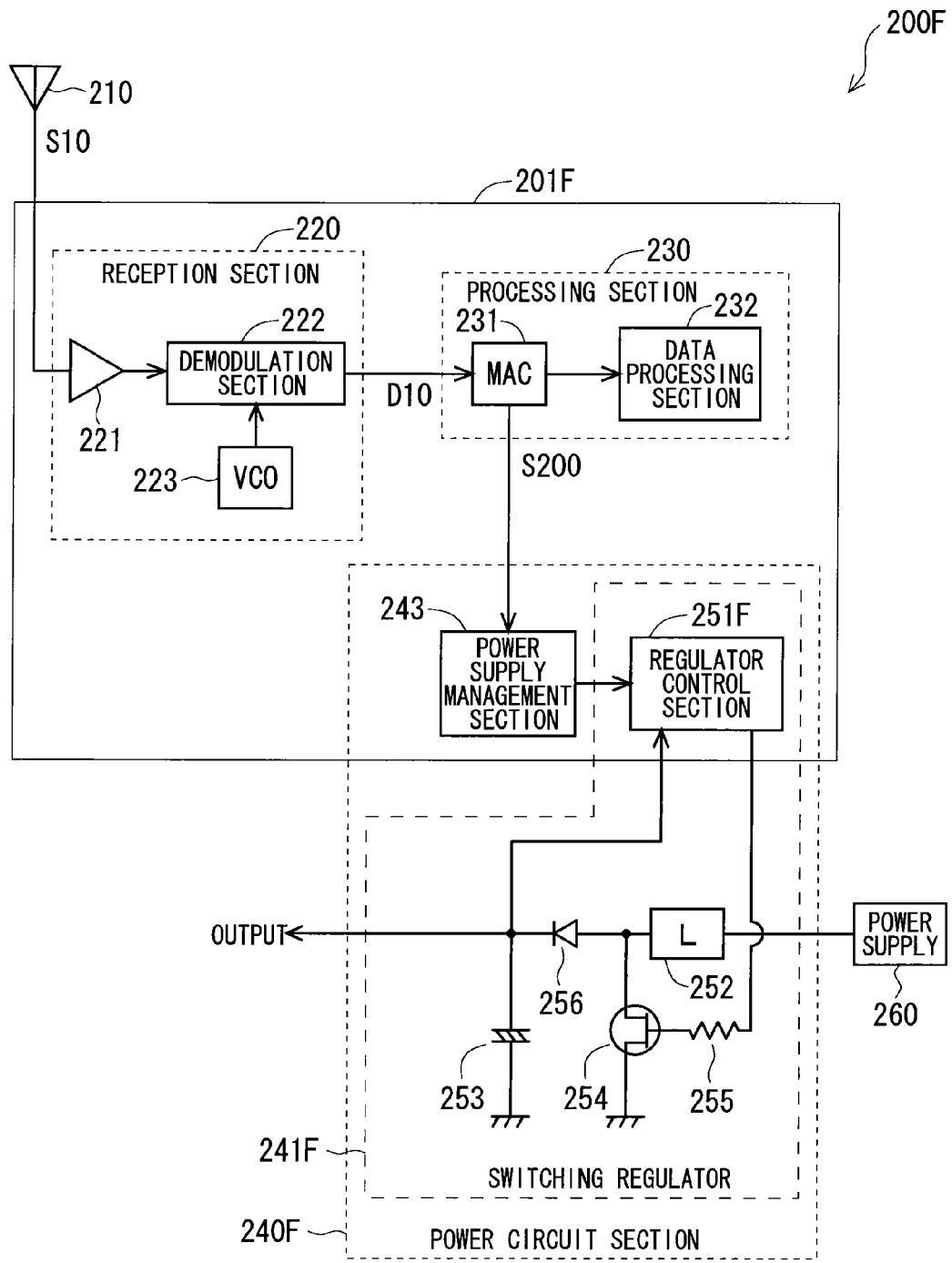
FIG. 25 A block diagram showing an outline of a second exemplary configuration of the second communication apparatus (power unit with communication function) according to the sixth embodiment.

A second communication apparatus 200F, and in other words, a power unit 200F with communication function, illustrated in FIG. 25 has the same configuration as that of the second communication apparatus 200E (see FIG. 24) described above, except that the power circuit section 240E is replaced with a power circuit section 240F. The power circuit section 240F is configured to include a SWR 241F instead of the SWR 241 (see FIG. 24). The other parts of the configuration of the power unit 200F with communication function are basically the same as those of the power unit 200E with communication function.

In an example shown in FIG. 25, the SWR 241F includes a regulator control section 251F, an inductor 252, a capacitor 253, a switching section 254, a resistance 255, and a diode 256.

The configuration and the function of the regulator control section 251F are the same as those of the SWR main circuit 251 (see FIG. 24), except that the switching section is not provided. Accordingly, the communication integrated circuit 201F is configured such that the SWR main circuit 251 of the communication integrated circuit 201 (see FIG. 24) is replaced with the regulator control section 251F.

The regulator control section 251F is connected to the switching section 254 provided outside, and controls ON/OFF of the switching section 254. In the example shown in FIG. 25, a transistor that is one example of the switching element is shown as the switching section 254. The gate of this transistor 254 is connected to the regulator control section 251F via the resistance 255.

The source of the transistor 254 is grounded. The drain of the transistor 254 is connected to the power supply 260 via an inductor L, and also connected to the anode of the diode 256. The cathode of the diode 256 is connected to one end of the capacitor 253, and the other end of the capacitor 253 is grounded.

A voltage of the aforesaid one end of the capacitor 253 is outputted as a voltage generated by the SWR 241F, and also fed back to the regulator control section 251F. In a case where the voltage of the aforesaid one end of the capacitor 253 is higher than an allowable voltage of the integrated circuit 201F, voltage reduction means such as a resistance may be provided between the capacitor 253 and the regulator control section 251F.

In the power units 200E and 200F with communication function, the above-described various effects exerted by the second communication apparatus 200 are obtained.

Although the SWR 241F illustrated in FIG. 25 is a step-up type, a step-down type SWR or a step-up/step-down type SWR is also adoptable.

It may be also possible that the function for generating the voltage for use in the integrated circuit 201, 201F is left in the power circuit section 240E, 240F.

In the examples given above, the second communication apparatus 200 according to the first embodiment is applied to the power units 200E and 200F with communication function. However, the other various second communication apparatuses described above are also applicable to the power unit with communication function. For example, the second communication apparatus 200C according to the fourth embodiment is applied to the power unit with communication function, and an apparatus for measuring external supply power is adopted as the sensor section 270 (see FIG. 14). Thereby, a power management system that enables used power to be managed in the first communication apparatus is provided.

Seventh Embodiment

Figure 26:
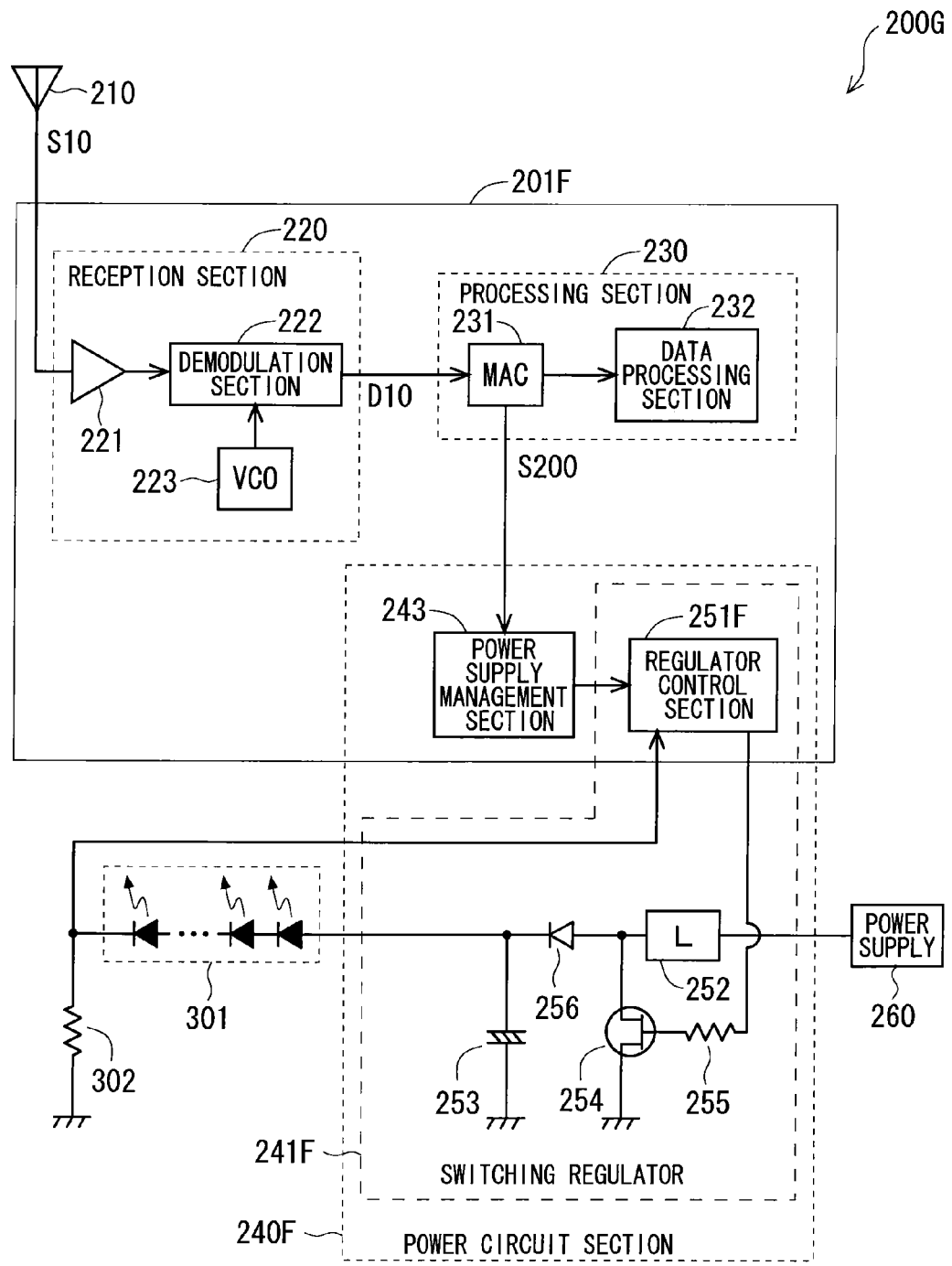
FIG. 26 A block diagram showing an outline of an exemplary configuration of a second communication apparatus (illumination apparatus with communication function) according to a seventh embodiment.

FIG. 26 illustrates a block diagram showing an outline of a communication apparatus 200G according to a seventh embodiment. The communication apparatus 200G is a communication apparatus with illumination, which is an application of the power unit with communication function according to the sixth embodiment. The communication apparatus 200G with illumination may be also called an illumination apparatus 200G with communication function.

In an example shown in FIG. 26, the illumination apparatus 200G with communication function has the same configuration as that of the power unit 200F with communication function, except that an LED illumination section 301 and a resistance 302 are additionally provided. That is, the power unit 200F with communication function is used as an LED driver. The other parts of the configuration of the illumination apparatus 200G with communication function are basically the same as those of the power unit 200F with communication function. The second communication apparatus 200G serving as the illumination apparatus with communication function is combined with the first communication apparatus 100 (see FIG. 2) and the like, to form the communication system 10 (see FIG. 1).

The LED illumination section 301 includes a plurality of LEDs that are connect in series such that the cathode of one LED is connected to the anode of another LED. The anode of the LED located at one end of this series connection structure is connected to an output end of the SWR 241F, that is, to the aforesaid one end of the capacitor 253. The cathode of the LED located at the other end of this series connection structure is connected to one end of the resistance 302, and the other end of the resistance 302 is grounded. The LED illumination section 301 may include only one LED.

In the power unit 200F with communication function (see FIG. 25), the voltage of the aforesaid one end of the capacitor 253 is fed back to the regulator control section 251F. Instead, in the illumination apparatus 200G with communication function, the voltage of the aforesaid one end of the resistance 302 is fed back to the regulator control section 251F.

In the illumination apparatus 200G with communication function, the above-described various effects exerted by the second communication apparatus 200F are obtained.

Instead of the power unit 200F with communication function, another power unit with communication function described in the sixth embodiment may be applied to the illumination apparatus with communication function.

Eighth Embodiment

Figure 27:
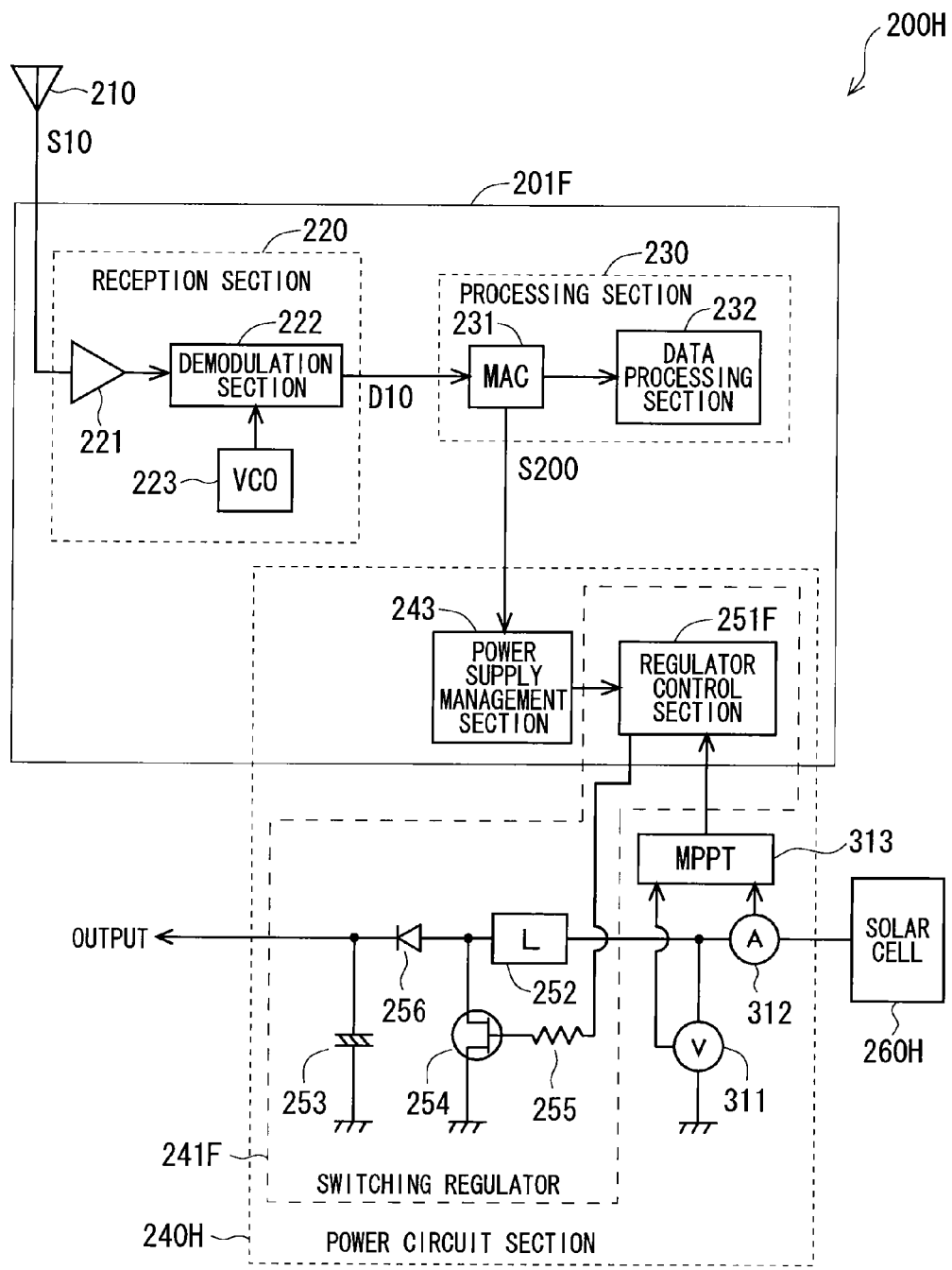
FIG. 27 A block diagram showing an outline of an exemplary configuration of a second communication apparatus (power unit with MPPT and communication functions) according to an eighth embodiment.

FIG. 27 illustrates a block diagram showing an outline of a communication apparatus 200H according to an eighth embodiment. The communication apparatus 200H is an apparatus configured by adding an MPPT (Maximum Power Point Tracking) function to the power unit with communication function according to the sixth embodiment. The second communication apparatus 200H is combined with the first communication apparatus 100 (see FIG. 2) and the like, to form the communication system 10 (see FIG. 1).

The MPPT function is used in, for example, in a solar cell power generation system. To be specific, it is necessary to control a solar cell so as to operate at the maximum power point (MPP) in order to efficiently extract power from the solar cell, and the MPPT function is a function for performing such a control.

The power unit 200H with communication function illustrated in FIG. 27 has the same configuration as that of the power unit 200F with communication function (see FIG. 25) according to the sixth embodiment, except that the power circuit section 240F is replaced with a power circuit section 240H. The power circuit section 240H has the same configuration as that of the power circuit section 240F (see FIG. 25), except that a voltage measurement section 311, a current measurement section 312, and an MPPT section 313 are additionally provided. The other parts of the configuration of the power unit 200H with communication function are basically the same as those of the power unit 200F with communication function. In FIG. 27, a solar cell 260H is illustrated instead of the power supply 260 (see FIG. 25).

The voltage measurement section 311 and the current measurement section 312, which are provided between the SWR 241 and the solar cell 260H, measure an output voltage and an output current of the solar cell 260H, and output measurement results to the MPPT section 313. The MPPT section 313 controls the switching operation of the SWR 241F by issuing an instruction to the regulator control section 251F such that the voltage and current measured by the measurement sections 311 and 312 are set to be a voltage and a current that give the maximum power point (MPP). As a method for searching the maximum power point, for example, the hill-climbing method is known. The MPPT section 313 issues an instruction of controlling the switching operation to the regulator control section 251F in accordance with an algorithm of the hill-climbing method. A method different from the hill-climbing method may be adopted.

In the power unit 200H with MPPT and communication functions, the above-described various effects exerted by the second communication apparatus 200F are obtained.

Instead of the power unit 200F with communication function, another power unit with communication function described in the sixth embodiment may be applied to the power unit 200H with MPPT and communication functions.

In an exemplary configuration, the measurement results of the measurement sections 311 and 312 are transmitted to the first communication apparatus by means of the communication function. Thereby, a power management system that enables an operational status of the solar cell 16011 to be managed in the first communication apparatus is provided.

Modification 1

In the description given above, a case where the communication system 10 is a wireless communication system is illustrated. However, it may be also possible that the communication apparatuses 100 and 200, and the like, are modified into wire communication apparatuses to thereby form a wire communication system. The above-described various effects are obtained in the wire communication system, too. The transmission section 120, and the like, and the reception section 220, and the like, are modified according to a wire communication scheme.

Modification 2

In the description given above, a case where the communication apparatuses 100 and 200, and the like, perform modulation/demodulation is illustrated. However, this illustration is not limiting. For example, in the wire communication, a so-called baseband transmission scheme is adoptable. The above-described various effects are also obtained in the baseband transmission scheme. The transmission section 120, and the like, and the reception section 220, and the like, are modified according to the baseband transmission scheme.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 10 communication system
100, 100B, 100C, 100D first communication apparatus
101, 101B, 101C, 101D communication integrated circuit
110 processing section
120, 120B transmission section
200, 200C to 200H second communication apparatus
201, 201C, 201D, 201F communication integrated circuit
220 reception section
230 processing section
240, 240E, 240F, 240H power circuit section
241, 241F switching regulator
242 charge section
260H solar cell
270 sensor section
301 LED illumination section
313 MPPT section
D10, D40 communication data
D30 original data
D13 switching allowance portion
S10 transmission signal
S200 control signal
T35 noise influence period
T36, T37 noise avoidance period
MA1 communication state
MA1a switching allowance portion reception period
MC non-communication-state

The invention claimed is:

1. A communication system, comprising:
a first communication apparatus configured to generate and transmit communication data in accordance with a predetermined protocol; and
a second communication apparatus including a power circuit section having a switching regulator, and configured to receive said communication data transmitted from said first communication apparatus, wherein
said predetermined protocol includes a protocol defining that at least one portion of a bit sequence constituting said communication data should be associated with an operation of said switching regulator,
in a state where said communication data is received, said second communication apparatus causes said switching regulator to operate within a time period in which said at least one portion of said communication data is received.

2. The communication system according to claim 1, wherein
said predetermined protocol includes a protocol defining that dummy data should be set in said at least one portion of said communication data,
said second communication apparatus removes said at least one portion from said communication data received, to modify said communication data.

3. The communication system according to claim 1, wherein
said second communication apparatus performs an error correction on said at least one portion of said communication data received.

4. The communication system according to claim 3, wherein
said at least one portion of said communication data is a plurality of portions,
said predetermined protocol includes a protocol defining that data set in one portion among said plurality of portions of said communication data should be processed in accordance with a processing method and data obtained as a result of the processing should be set in a remaining portion among said plurality of portions, said second communication apparatus reverse-processes the data set in said remaining portion of said communication data received, in accordance with said processing method, said second communication apparatus performs said error correction by using data obtained as a result of the reverse-processing and said data set in said one portion of said communication data.

5. The communication system according to claim 1, wherein
said first communication apparatus transmits said at least one portion of said communication data with greater power than a portion other than said at least one portion.

6. The communication system according to claim 1, wherein
said second communication apparatus causes said switching regulator to operate also in a state where said communication data is not received.

7. The communication system according to claim 1, wherein
said power circuit section of said second communication apparatus further includes a charge section configured to charge power generated by said switching regulator and to supply the charged power to a predetermined element of said second communication apparatus.

8. The communication system according to claim 7, wherein
said charge section is a capacitor.

9. The communication system according to claim 1, wherein
said second communication apparatus further includes a sensor section,
said second communication apparatus generates communication data concerning a result detected by said sensor section, and transmits said communication data to said first communication apparatus.

10. The communication system according to claim 1, wherein
said second communication apparatus is configured such that an output voltage of said switching regulator is outputtable to the outside of said second communication apparatus.

11. The communication system according to claim 1, wherein
said second communication apparatus further includes an LED illumination section that is driven by an output voltage of said switching regulator.

12. The communication system according to claim 1, wherein
said second communication apparatus further includes:
a voltage measurement section and a current measurement section configured to measure an output voltage and an output current of a solar cell; and
an MPPT (Maximum Power Point Tracking) section configured to control said switching operation of said switching regulator such that the voltage and the current measured by said voltage measurement section and said current measurement section can be set to a voltage and a current that give a maximum power point.

13. A communication system, comprising:
a first communication apparatus configured to generate and transmit communication data; and
a second communication apparatus including a power circuit section having a switching regulator, and configured to receive said communication data transmitted from said first communication apparatus,
wherein
said first communication apparatus generates said communication data by dividing a bit sequence constituting original data of said communication data into a plurality of blocks and arranging said plurality of blocks such that each of said plurality of blocks successively appears at least twice,
said second communication apparatus causes said switching regulator to operate in a state where said communication data is received,
said second communication apparatus restores said original data by extracting said plurality of blocks from said communication data while avoiding, on a unit basis of said block, a portion received during a noise influence period among said communication data received, said noise influence period being determined in accordance with a switching operation of said switching regulator.

14. The communication system according to claim 13, wherein
a succession of at least two said blocks are receivable in at least one of a first noise avoidance period and a second noise avoidance period in one cycle of said switching operation, said first noise avoidance period being a portion of an ON-time period excluding said noise influence period, said second noise avoidance period being a portion of an OFF-time period excluding said noise influence period.

15. The communication system according to claim 13, wherein
said second communication apparatus further includes a sensor section,
said second communication apparatus generates communication data concerning a result detected by said sensor section, and transmits said communication data to said first communication apparatus.

16. The communication system according to claim 13, wherein
said second communication apparatus is configured such that an output voltage of said switching regulator is outputtable to the outside of said second communication apparatus.

17. The communication system according to claim 13, wherein
said second communication apparatus further includes an LED illumination section that is driven by an output voltage of said switching regulator.

18. The communication system according to claim 13, wherein
said second communication apparatus further includes:
a voltage measurement section and a current measurement section configured to measure an output voltage and an output current of a solar cell; and
an MPPT (Maximum Power Point Tracking) section configured to control said switching operation of said switching regulator such that the voltage and the current measured by said voltage measurement section and said current measurement section can be set to a voltage and a current that give a maximum power point.

19. A communication system, comprising:
a first communication apparatus configured to generate and transmit communication data; and
a second communication apparatus including a power circuit section having a switching regulator, and configured to receive said communication data transmitted from said first communication apparatus,
wherein said first communication apparatus generates said communication data by dividing a bit sequence constituting original data of said communication data into a plurality of blocks and arranging said plurality of blocks such that each of said plurality of blocks successively appears at least twice, said second communication apparatus causes said switching regulator to operate in a state where said communication data is received, said second communication apparatus restores said original data by extracting said plurality of blocks from said communication data while avoiding, on a unit basis of a sub-block, a portion received during a noise influence period among said communication data received, said sub-block being obtained by subdividing said block, said noise influence period being determined in accordance with a switching operation of said switching regulator.

20. The communication system according to claim 19, wherein
said sub-block is obtained by equally dividing said block into two parts,
a succession of at least three said sub-blocks are receivable in at least one of a first noise avoidance period and a second noise avoidance period in one cycle of said switching operation, said first noise avoidance period being a portion of an ON-time period excluding said noise influence period, said second noise avoidance period being a portion of an OFF-time period excluding said noise influence period.

21. The communication system according to claim 19, wherein
said second communication apparatus further includes a sensor section,
said second communication apparatus generates communication data concerning a result detected by said sensor section, and transmits said communication data to said first communication apparatus.

22. The communication system according to claim 19, wherein
said second communication apparatus is configured such that an output voltage of said switching regulator is outputtable to the outside of said second communication apparatus.

23. The communication system according to claim 19, wherein
said second communication apparatus further includes an LED illumination section that is driven by an output voltage of said switching regulator.

24. The communication system according to claim 19, wherein
said second communication apparatus further includes:
a voltage measurement section and a current measurement section configured to measure an output voltage and an output current of a solar cell; and
an MPPT (Maximum Power Point Tracking) section configured to control said switching operation of said switching regulator such that the voltage and the current measured by said voltage measurement section and said current measurement section can be set to a voltage and a current that give a maximum power point.

25. A communication apparatus, comprising:
a reception section configured to receive a transmission signal that transmits communication data generated in accordance with a predetermined protocol, and restore said communication data from said transmission signal;
a processing section configured to perform a predetermined process by using said communication data restored; and
a power circuit section including a switching regulator,
wherein
said predetermined protocol includes a protocol defining that at least one portion of a bit sequence constituting said communication data should be associated with an operation of said switching regulator,
said reception section restores and outputs said communication data to said processing section in real time along with reception of said transmission signal,
said processing section detects said at least one portion of said communication data in accordance with said predetermined protocol, and causes said switching regulator to operate in a time period in which said at least one portion is obtained from said reception section.

26. A communication apparatus, comprising:
a processing section configured to generate communication data in accordance with a predetermined protocol; and
a transmission section configured to generate and transmit a transmission signal for transmitting said communication data,
wherein
said predetermined protocol includes a protocol defining that at least one portion of a bit sequence constituting said communication data should be associated with an operation of a switching regulator provided in a power circuit section of an apparatus that is configured to receive said transmission signal,
said processing section controls said transmission section such that said at least one portion of said communication data is transmitted with greater power than a portion other than said at least one portion.

27. A communication apparatus, comprising:
a processing section configured to generate communication data; and
a transmission section configured to generate and transmit a transmission signal for transmitting said communication data,
wherein
said processing section generates said communication data by dividing a bit sequence constituting original data of said communication data into a plurality of blocks and arranging said plurality of blocks such that each of said plurality of blocks successively appears at least twice.

28. A communication apparatus, comprising:
a reception section configured to receive a transmission signal that transmits communication data, and restore said communication data from said transmission signal;
a processing section configured to perform a predetermined process by using said communication data restored; and
a power circuit section including a switching regulator,
wherein
said communication data is structured by dividing a bit sequence constituting original data of said communication data into a plurality of blocks and arranging said plurality of blocks such that each of said plurality of blocks successively appears at least twice,
said power circuit section causes said switching regulator to operate in a state where said communication data is received,
said processing section restores said original data by extracting said plurality of blocks from said communication data while avoiding, on a unit basis of said block, a portion received during a noise influence period among said communication data received, said noise influence period being determined in accordance with a switching operation of said switching regulator.

29. A communication apparatus, comprising:
a reception section configured to receive a transmission signal that transmits communication data, and restore said communication data from said transmission signal;
a processing section configured to perform a predetermined process by using said communication data restored; and
a power circuit section including a switching regulator, wherein
said communication data is structured by dividing a bit sequence constituting original data of said communication data into a plurality of blocks and arranging said plurality of blocks such that each of said plurality of blocks successively appears at least twice,
said power circuit section causes said switching regulator to operate in a state where said communication data is received,
said processing section restores said original data by extracting said plurality of blocks from said communication data while avoiding, on a unit basis of a sub-block, a portion received during a noise influence period among said communication data received, said sub-block being obtained by subdividing said block, said noise influence period being determined in accordance with a switching operation of said switching regulator.

30. A communication integrated circuit adoptable in a communication apparatus including a switching regulator provided in a power circuit section, said communication integrated circuit comprising:
a reception section configured to receive a transmission signal that transmits communication data generated in accordance with a predetermined protocol, and restore said communication data from said transmission signal; and
a processing section configured to perform a predetermined process by using said communication data restored,
wherein
said predetermined protocol includes a protocol defining that at least one portion of a bit sequence constituting said communication data should be associated with an operation of said switching regulator,
said reception section restores and outputs said communication data to said processing section in real time along with reception of said transmission signal,
said processing section detects said at least one portion of said communication data in accordance with said predetermined protocol, and outputs a control signal for operating said switching regulator in a time period in which said at least one portion is obtained from said reception section.

31. The communication integrated circuit according to claim 30, further comprising at least a part of said power circuit section.

32. A communication integrated circuit adoptable in a communication apparatus including a switching regulator provided in a power circuit section, said communication integrated circuit comprising:
a reception section configured to receive a transmission signal that transmits communication data, and restore said communication data from said transmission signal; and a processing section configured to perform a predetermined process by using said communication data restored,
wherein
said communication data is structured by dividing a bit sequence constituting original data of said communication data into a plurality of blocks and arranging said plurality of blocks such that each of said plurality of blocks successively appears at least twice,
said processing section restores said original data by extracting said plurality of blocks from said communication data while avoiding, on a unit basis of said block, a portion received during a noise influence period among said communication data received while said switching regulator is in operation, said noise influence period being determined in accordance with a switching operation of said switching regulator.

33. The communication integrated circuit according to claim 32, further comprising at least a part of said power circuit section.

34. A communication integrated circuit adoptable in a communication apparatus including a switching regulator provided in a power circuit section, said communication integrated circuit comprising:
a reception section configured to receive a transmission signal that transmits communication data, and restore said communication data from said transmission signal; and
a processing section configured to perform a predetermined process by using said communication data restored,
wherein
said communication data is structured by dividing a bit sequence constituting original data of said communication data into a plurality of blocks and arranging said plurality of blocks such that each of said plurality of blocks successively appears at least twice,
said processing section restores said original data by extracting said plurality of blocks from said communication data while avoiding, on a unit basis of a sub-block, a portion received during a noise influence period among said communication data received while said switching regulator is in operation, said sub-block being obtained by subdividing said block, said noise influence period being determined in accordance with a switching operation of said switching regulator.

35. The communication integrated circuit according to claim 34, further comprising at least a part of said power circuit section.

36. A communication integrated circuit, comprising:
a processing section configured to generate communication data in accordance with a predetermined protocol; and
a transmission section configured to generate and transmit a transmission signal that transmits said communication data,
wherein
said predetermined protocol includes a protocol defining that at least one portion of a bit sequence constituting said communication data should be associated with an operation of a switching regulator provided in a power circuit section of an apparatus that is configured to receive said transmission signal,
said processing section controls said transmission section such that said at least one portion of said communication data is transmitted with greater power than a portion other than said at least one portion.

37. A communication integrated circuit, comprising:
a processing section configured to generate communication data; and
a transmission section configured to generate and transmit a transmission signal for transmitting said communication data,
wherein
said processing section generates said communication data by dividing a bit sequence constituting original data of said communication data into a plurality of blocks and arranging said plurality of blocks such that each of said plurality of blocks successively appears at least twice.

* * * * *